US008784719B2

(12) United States Patent
Lingannaiah et al.

(10) Patent No.: US 8,784,719 B2
(45) Date of Patent: Jul. 22, 2014

(54) FLOW IN REINFORCED POLYIMIDE COMPOSITIONS

(75) Inventors: Chandrashekhar Lingannaiah, Karnataka (IN); Anton Kumanan, Tamil Nadu (IN); Reema Sinha, Karnataka (IN); Anirban Ganguly, Karnataka (IN); Susanta Mitra, Karnataka (IN); Anne Bolvari, West Chester, PA (US); Zheng Yun, Shanghai (CN)

(73) Assignee: Sabic Global Technologies B.V., Bergen op Zoom (NL)

( * ) Notice: Subject to any disclaimer, the term of this patent is extended or adjusted under 35 U.S.C. 154(b) by 247 days.

(21) Appl. No.: 13/174,772

(22) Filed: Jun. 30, 2011

(65) Prior Publication Data

US 2013/0001824 A1    Jan. 3, 2013

(51) Int. Cl.
- *B29C 45/46* (2006.01)
- *C08L 79/08* (2006.01)
- *C08K 7/02* (2006.01)
- *C08L 77/00* (2006.01)
- *C08K 7/14* (2006.01)

(52) U.S. Cl.
CPC . *C08L 79/08* (2013.01); *C08K 7/02* (2013.01); *C08L 77/00* (2013.01); *C08K 7/14* (2013.01)
USPC .................. 264/328.18; 264/331.19; 522/111; 524/606

(58) Field of Classification Search
CPC ........... C08L 79/08; C08L 77/00; C08K 7/02; C08K 7/14
USPC ........... 264/328.18, 331.16, 331.19; 522/111; 524/606
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,241,323 A | 5/1941 | Greenewalt |
| 2,312,966 A | 3/1943 | Hanford |
| 2,512,606 A | 6/1950 | Kirk et al. |
| 3,393,210 A | 7/1968 | Speck et al. |

(Continued)

OTHER PUBLICATIONS

International Preliminary Report on Patentability issued Jan. 7, 2014 by the International Searching Authority for PCT Application PCT/US2012/044140 which published as WO2013003314 on Jan. 3, 2013 (Applicant—SABIC Innovative Plastics IP B.V. // Inventor—Lingannaiah) (6 pages).

(Continued)

*Primary Examiner* — Jill Heitbrink
(74) *Attorney, Agent, or Firm* — Baker & Hostetler LLP

(57) ABSTRACT

Reinforced polyimide compositions that include a reinforcing filler and a polyamide flow promoter improve flow promotion while maintaining other mechanical, thermal, flame and/or electrical properties of the compositions. The compositions may include an inorganic or organic reinforcing filler, a polyimide resin such as polyetherimide or polyamideimide and a small amount of an aromatic or aliphatic polyamide as the flow promoter. The resulting compositions may be used in thinner-wall applications while still retaining the advantageous physical properties of reinforced polyimide compositions not having the flow promoter. This abstract is intended as a scanning tool for purposes of searching in the particular art and is not intended to be limiting of the present invention.

20 Claims, 9 Drawing Sheets

(56) References Cited

U.S. PATENT DOCUMENTS

| | | | |
|---|---|---|---|
| 4,467,011 A * | 8/1984 | Brooks et al. | 442/239 |
| 4,515,924 A * | 5/1985 | Brooks et al. | 525/432 |
| RE34,447 E | 11/1993 | Poppe et al. | |
| 5,322,923 A | 6/1994 | Lahary et al. | |
| 5,378,800 A | 1/1995 | Mok et al. | |
| 5,424,104 A | 6/1995 | Amimoto et al. | |
| 5,969,079 A * | 10/1999 | Lubowitz et al. | 528/170 |
| 6,140,459 A | 10/2000 | Leboeuf et al. | |
| 2009/0068432 A1 * | 3/2009 | Gallucci et al. | 264/528 |
| 2009/0099299 A1 | 4/2009 | Gallucci et al. | |
| 2009/0099300 A1 | 4/2009 | Gallucci et al. | |

OTHER PUBLICATIONS

International Search Report issued Jan. 3, 2013 by the International Searching Authority for PCT Application PCT/US2012/044140 which published as WO2013003314 on Jan. 3, 2013 (Applicant—SABIC Innovative Plastics IP B.V. // Inventor—Lingannaiah) (3 pages).

Written Opinion issued Dec. 31, 2013 by the International Searching Authority for PCT Application PCT/US2012/044140 which published as WO2013003314 on Jan. 3, 2013 (Applicant—SABIC Innovative Plastics IP B.V. // Inventor—Lingannaiah) (5 pages).

* cited by examiner

FLOW IN REINFORCED POLYIMIDE COMPOSITIONS

FIELD OF INVENTION

The present invention relates to reinforced polyimide compositions having improved flow, articles of manufacture that include a reinforced polyimide composition having improved flow, and methods of making reinforced polyimide compositions having improved flow.

BACKGROUND

Polyimides (PI), and in particular polyetherimides (PEI), are high performance polymers having a glass transition temperature (Tg) of greater than 180° C. These polymers further have high strength, heat resistance, and modulus, and broad chemical resistance. Polyetherimides are widely used in applications as diverse as automotive, telecommunication, aerospace, electrical/electronics, transportation, and healthcare. Adding a reinforcing filler helps provide materials that are particularly useful as molded parts for metal replacement, for example in automotive and electrical/electronic applications since these compositions offer good mechanical and thermal properties.

However, one of the issues with reinforced polyetherimides is the reinforcing filler negatively affects the flow properties of the resin. The addition of certain prior art flow promoters has been utilized, but these flow promoters can negatively affect mechanical, thermal, flame and/or electrical properties of the compositions.

Accordingly, it would be beneficial to provide a reinforced polyimide composition that has improved flow promotion as compared to reinforced polyimide compositions without the flow promoter while still maintaining excellent physical properties. It would also be beneficial to provide a reinforced polyimide composition that may be used in thin-walled applications while still maintaining excellent physical properties.

SUMMARY OF THE INVENTION

In one aspect, the invention relates to reinforced polyimide compositions comprising a polyimide polymer, a reinforcing filler and a polyamide flow promoter. The flow promoter improves flow promotion of the polyimide composition while maintaining other mechanical, thermal, flame and/or electrical properties. Thus, in a further aspect, the resulting compositions are therefore capable of being used in thin-walled applications while still retaining the advantageous physical properties of reinforced polyimide compositions not having the flow promoter.

In a further aspect, described herein are compositions comprising:
(a) from about 10 wt % to 60 wt % of a reinforcing filler;
(b) from about 1 wt % to about 10 wt % of a polyamide flow promoter; and
(c) weight % balance of a polyimide resin;
wherein the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical injection molding conditions. In a yet further aspect, described herein are articles made from the disclosed compositions.

In a still further aspect, described herein are reinforced polyimide compositions comprising
(a) a polyimide resin;
(b) a reinforcing filler in an amount resulting in a resin:filler ratio of from about 1:2 to about 9:1; and
a polyamide flow promoter in an amount effective such that the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical injection molding conditions.

In an even further aspect, described herein are methods for increasing linear flow during injection molding of a reinforced polyimide composition, the method comprising combining a polyimide resin, a reinforcing filler, and a polyamide flow promoter; wherein the reinforcing filler is combined in an amount resulting in a resin:filler ratio of from about 1:2 to about 9:1; and wherein the polyamide flow promoter is combined in an amount effective such that the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical conditions.

In a yet further aspect, described herein are methods for restoring injection molding linear flow loss in a reinforced polyimide composition, the method comprising adding, to a mixture of polyimide resin and a reinforcing filler, a polyamide flow promoter in an amount sufficient to restore at least about 10% of flow loss observed when comparing injection molding linear flow rate of a reference reinforced polyimide composition consisting essentially of substantially the same proportions of the same polyimide resin and the same reinforcing filler, in the absence of polyamide flow promoter, under substantially identical injection molding conditions, to injection molding linear flow rate of a substantially identical unfilled reinforced polyimide, in the absence of polyamide flow promoter, under substantially identical injection molding conditions.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

Figure 1:
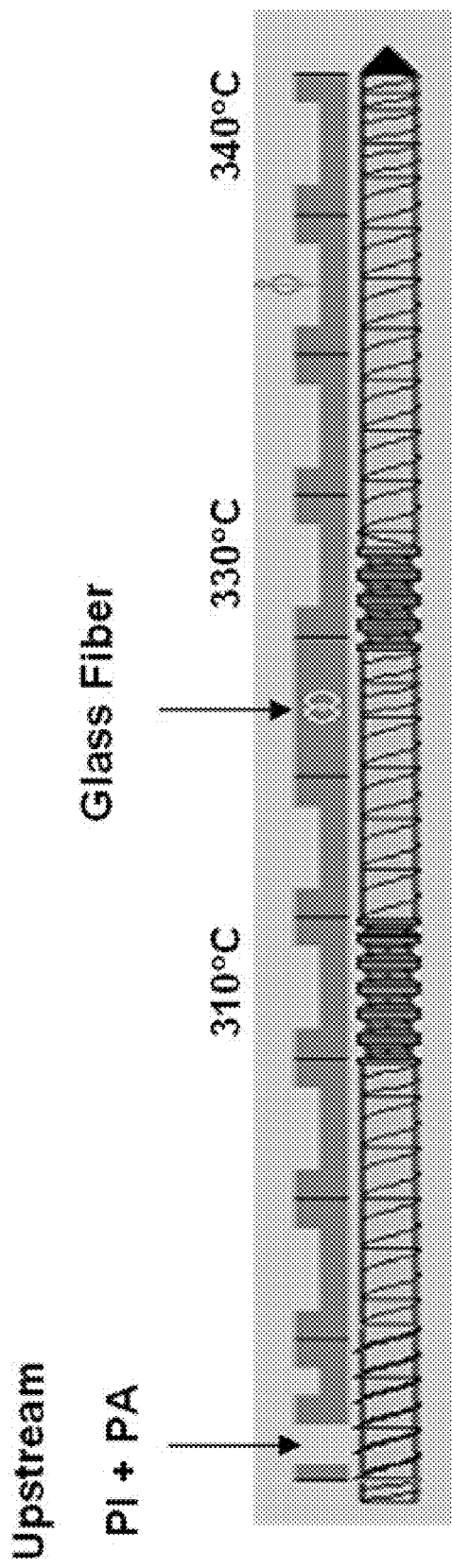
FIG. 1 shows a schematic illustration of a representative PET screw used for compounding exemplary disclosed compositions.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Before the present compounds, compositions, articles, devices, and/or methods are disclosed and described, it is to be understood that the aspects described below are not limited to specific synthetic methods as such may, of course, vary. It is also to be understood that the terminology used herein is for the purpose of describing particular aspects only and is not intended to be limiting. As used in the specification and in the claims, the term "comprising" may include the embodiments "consisting of" and "consisting essentially of."

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. Thus, if a class of fillers A, B, and C are disclosed as well as a class of additives D, E, and F and an example of a combination A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, compositions, and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Furthermore, for example, reference to a filler includes mixtures of fillers.

The term "polyamide flow promoter," as used herein, refers to a polyamide which increases the linear flow properties of a polymer blend comprising a polyimide polymer and a reinforcing filler. Examples of polyamides useful as flow promoters are described in this specification.

The term "polyphthalamide," as used herein, refers to a polyamide in which the residues of terephthalic acid or isophthalic acid or a combination of the two comprise at least 55 molar percent of the dicarboxylic acid portion of the repeating structural units in the polymer chain.

The term "reinforcing filler", as used herein, refers to an organice or inorganic material or agent that is added to polymer blend to impart improved mechanical properties to the finished material. Examples of reinforcing fillers are described in this specification.

As used herein, the term "effective amount" refers to an amount that is sufficient to achieve the desired modification of a physical property of the composition or material. For example, a "effective amount" of a polyamide flow promoter refers to an amount that is sufficient to achieve the desired improvement in linear flow, but is generally insufficient to cause negative alteration of other properties such as heat resistance, strength, impact resistance and the like. The specific level in terms of wt % in a composition required as an effective amount will depend upon a variety of factors including the amount and type of reinforcing filler, amount and type of polyimide, and end use of the article made using the composition.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight or volume, of a particular element or component in a composition or article, denotes the weight or volume relationship, respectively, between the element or component and any other elements or components in the composition or article for which a part by weight or volume, respectively, is expressed. Thus, in a composition containing 2 parts by weight of component X and 5 parts by weight component Y, X and Y are present at a weight ratio of 2:5, and are present in such ratio regardless of whether additional components are contained in the composition. This example is equally applicable to parts by volume.

A weight percent or volume percent of a component, unless specifically stated to the contrary, is based on the total weight or volume, respectively, of the formulation or composition in which the component is included.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

In one aspect, present invention provides reinforced polyimide compositions comprising a polyimide, a reinforcing filler and a polyamide flow promoter. The compositions of the present invention offer improved flow promotion without compromising the mechanical, thermal, flame and/or electrical properties of the finished material. The compositions may include an inorganic or organic reinforcing filler, a polyimide resin such as polyetherimide or polyamideimide and an effective amount of an aromatic or aliphatic polyamide as the flow promoter. The resulting compositions may be used in thinner-wall applications than prior art reinforced polyimide compositions not having the flow promoter while still retaining the advantageous physical properties of reinforced polyimide compositions not having the flow promoter.

In one aspect, the invention relates to compositions comprising:
  (a) from about 10 wt % to 60 wt % of a reinforcing filler;
  (b) from about 1 wt % to about 10 wt % of a polyamide flow promoter; and
  (c) weight % balance of a polyimide resin;
wherein the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical injection molding conditions. In a still further aspect, the composition exhibits a linear flow during injection molding of at least about 125% that of the reference reinforced polyimide composition. In a yet further aspect, the composition exhibits a linear flow during injection molding of at least about 150% that of the reference reinforced polyimide composition.

In a further aspect, the polyimide resin is selected from polyetherimide, polyamideimide; or a combination including at least one of the foregoing polyimide resins. In a still further aspect, the polyimide resin is present in an amount of from about 50% to about 80% of the total composition. In a yet further aspect, the polyimide resin is present in an amount of from about 60% to about 70% of the total composition. In an even further aspect, the polyimide resin is present in an amount of about 60% of the total composition.

In a further aspect, the reinforcing filler comprises glass fibers. In a still further aspect, the reinforcing filler is selected from glass fiber, glass flake, glass beads, carbon fiber, aramid fiber, or a combination including at least one of the foregoing reinforcing fillers. In an even further aspect, the reinforcing filler comprises glass fibers. In a still further aspect, the reinforcing filler is present in an amount of from about 20% to about 50% of the total composition. In a yet further aspect, the reinforcing filler is present in an amount of from about 30% to about 40% of the total composition. In an even further aspect, the reinforcing filler is present in an amount of about 40% of the total composition.

In a further aspect, the polyamide flow promoter is selected from nylon and polyphthalamide. In a yet further aspect, the polyamide flow promoter comprises a polyphthalamide. In a still further aspect, the polyamide flow promoter comprises a nylon. In a further aspect, the polyamide flow promoter is selected from nylon 6, nylon 66, a polyphthalamide, or a combination including at least one of the foregoing polyamide flow promoters. In a still further aspect, the polyamide flow promoter is selected from nylon 6, nylon 66, nylon 11, nylon 610, nylon 410, nylon 1010, nylon 1012, nylon 510, nylon 6T, nylon 6I, nylon 10T, nylone 10I, or a combination thereof including at least one of the foregoing polyamide flow promoters. In a yet further aspect, the polyamide flow promoter is selected from a blend of a nylon and a polythalamide. In a still further aspect, the blend of a polyamide and a polythalamide comprises a polyamide selected from nylon 6, nylon 66, nylon 11, nylon 610, nylon 410, nylon 1010, nylon 1012, nylon 510, and a polyphthalmide selected from nylon 6T, nylon 6I, nylon 10T, nylon 10I.

In an even further aspect, the polyamide flow promoter is present in an amount of from about 1% to about 5% of the total composition. In a still further aspect, the polyamide flow promoter is present in an amount of from about 5% to about 10% of the total composition. In an even further aspect, wherein the polyamide flow promoter is present in an amount of less than about 5% of the total composition.

In a further aspect, the polyamide flow promoter is present in an amount insufficient to substantially increase either the smoke or flammability properties of the polyimide composition, compared to the reference reinforced polyimide composition. In an even further aspect, the polyamide flow promoter is present in an amount insufficient to substantially increase the smoke properties of the polyimide composition, compared to the reference reinforced polyimide composition. In a yet further aspect, the polyamide flow promoter is present in an amount insufficient to substantially increase the flammability properties of the polyimide composition, compared to the reference reinforced polyimide composition. In a still further aspect, the smoke property is $D_s$ (20). In a yet further aspect, the $D_s$ (20) does not increase by more than about 2 times, more than about 5 times, more than about 7 times, or more than about 10 times. In an even further aspect, the $D_s$ (20) does not increase by more than about 5 times. In a yet further aspect, the flammability property is p(FTP). In a still further aspect, the p(FTP) does not decrease by more than about 2.5%, by more than about 5%, by more than about 7.5%, or more than about 10%. In an even further aspect, the p(FTP) does not decrease by more than about 5%.

In a further aspect, wherein the polyamide flow promoter is present in an amount insufficient to substantially decrease the heat deflection temperature of the polyimide composition, compared to the reference reinforced polyimide composition. In a yet further aspect, the heat deflection temperature does not decrease by more than about 2.5%, by more than about 5%, by more than about 7.5%, more than about 10%, more than about 12.5%, more than about 15%, or more than about 20%. In an even further aspect, the heat deflection temperature does not decrease by more than about 10%.

In a further aspect, the polyamide flow promoter is present in an amount insufficient to substantially decrease either the flex modulus or flex strength of the polyimide composition, compared to the reference reinforced polyimide composition. In an even further aspect, the polyamide flow promoter is present in an amount insufficient to substantially decrease the flex modulus of the polyimide composition, compared to the reference reinforced polyimide composition. In a still further aspect, the polyamide flow promoter is present in an amount insufficient to substantially decrease the flex strength of the polyimide composition, compared to the reference reinforced polyimide composition. In a yet further aspect, the flex strength does not decrease by more than about 2.5%, by more than about 5%, by more than about 7.5%, more than about 10%, more than about 12.5%, more than about 15%, or more than about 20%. In an even further aspect, the flex strength does not decrease by more than about 10%. In a yet further aspect, the flex modulus does not decrease by more than about 2.5%, by more than about 5%, by more than about 7.5%, more than about 10%, more than about 12.5%, more than about 15%, or more than about 20%. In an even further aspect, the flex modulus does not decrease by more than about 10%.

In a further aspect, the polyamide flow promoter is present in an amount insufficient to substantially decrease either the tensile modulus or tensile strength of the polyimide composition, compared to the reference reinforced polyimide composition. In an even further aspect, the polyamide flow promoter is present in an amount insufficient to substantially decrease the tensile modulus of the polyimide composition, compared to the reference reinforced polyimide composition. In an even further aspect, the polyamide flow promoter is present in an amount insufficient to substantially decrease the tensile strength of the polyimide composition, compared to the reference reinforced polyimide composition. In a yet further aspect, the tensile strength does not decrease by more than about 10%, by more than about 12%, by more than about 14%, more than about 16%, more than about 18%, more than about 20%, more than about 22%, more than about 24%, or more than about 26%. In an even further aspect, the tensile strength does not decrease by more than about 18%. In a yet further aspect, the tensile modulus does not decrease by more than about 2.5%, by more than about 5%, by more than about 7.5%, more than about 10%, more than about 12.5%, more than about 15%, or more than about 20%. In an even further aspect, the tensile modulus does not decrease by more than about 10%.

In a further aspect, the polyamide flow promoter is present in an amount insufficient to substantially decrease the impact strength of the polyimide composition, compared to the reference reinforced polyimide composition. In a yet further aspect, the impact strength does not decrease by more than about 20%, by more than about 22.5%, by more than about 25%, more than about 27.5%, more than about 30%, more than about 32.5%, more than about 35%, more than about 37.5%, or more than about 40%. In an even further aspect, the impact strength does not decrease by more than about 30%.

In a further aspect, the invention relates to reinforced polyimide compositions comprising:
  (a) a polyimide resin;
  (b) a reinforcing filler in an amount resulting in a resin:filler ratio of from about 1:2 to about 9:1; and
  (c) a polyamide flow promoter in an amount effective such that the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical injection molding conditions.

In a further aspect, the resin:filler ratio is from about 1:2 to about 2:1. In a still further aspect, the resin:filler ratio is from about 1:1 to about 2:1. In yet further aspect, the resin:filler ratio is from about 2:1 to about 1:2. In an even further aspect, the resin:filler ratio is from about 5:1 to about 1:1. In a still further aspect, the resin:filler ratio is from about 4:1 to about 1:1. In a yet further aspect, the resin:filler ratio is from about 3:1 to about 1:1. In an even further aspect, the resin:filler ratio is about 3:2.

In a further aspect, the invention relates to methods for increasing linear flow during injection molding of a reinforced polyimide composition, the method comprising combining a polyimide resin, a reinforcing filler, and a polyamide flow promoter; wherein the reinforcing filler is combined in an amount resulting in a resin:filler ratio of from about 1:2 to about 9:1; and wherein the polyamide flow promoter is combined in an amount effective such that the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical conditions.

In a further aspect, the polyimide resin is combined in an amount of from about 30% to about 89% of the total composition. In still further aspect, the reinforcing filler is combined in an amount of from about 10% to about 60% of the total composition. In a yet further aspect, the polyamide flow promoter is combined in an amount of from about 1% to about 10% of the total composition.

In a further aspect, the invention relates to methods for increasing linear flow during injection molding of a reinforced polyimide composition, the method comprising combining a polyimide resin, a reinforcing filler, and a polyamide flow promoter; wherein the reinforcing filler is combined in an amount resulting in a resin:filler ratio of from about 1:2 to about 9:1; and wherein the polyamide flow promoter is combined in an amount effective such that the composition exhibits a linear flow during injection molding of at least about 10% greater than that of a reference reinforced polyimide composition consisting essentially of substantially the same proportions of the same polyimide resin and the same reinforcing filler, in the absence of polyamide flow promoter, under substantially identical conditions. In a yet further aspect, the composition exhibits a linear flow during injection molding of at least about 125% that of the reference reinforced polyimide composition. In an even further aspect, the composition exhibits a linear flow during injection molding of at least about 150% that of the reference reinforced polyimide composition. In a still further aspect, the polyimide resin is combined in an amount of from about 30% to about 89% of the total composition. In a yet further aspect, the reinforcing filler is combined in an amount of from about 10% to about 60% of the total composition. In an even further aspect, the polyamide flow promoter is combined in an amount of from about 1% to about 10% of the total composition.

In a further aspect, the invention relates to methods for restoring injection molding linear flow loss in a reinforced polyimide composition, the method comprising adding, to a mixture of polyimide resin and a reinforcing filler, a polyamide flow promoter in an amount sufficient to restore at least about 10% of flow loss observed when comparing injection molding linear flow rate of a reference reinforced polyimide composition consisting essentially of substantially the same proportions of the same polyimide resin and the same reinforcing filler, in the absence of polyamide flow promoter, under substantially identical injection molding conditions, to injection molding linear flow rate of a substantially identical unfilled reinforced polyimide, in the absence of polyamide flow promoter, under substantially identical injection molding conditions. In a yet further aspect, the polyamide flow promoter restores at least about 20% of flow loss. In a still further aspect, the polyamide flow promoter restores at least about 30% of flow loss.

In a further aspect, addition of the polyamide flow promoter does not substantially increase either the smoke or flammability properties of the polyimide composition, compared to the reference reinforced polyimide composition. In a yet further aspect, addition of the polyamide flow promoter does not substantially increase the smoke properties of the polyimide composition, compared to the reference reinforced polyimide composition. In a still further aspect, addition of the polyamide flow promoter does not substantially increase the flammability properties of the polyimide, compared to the reference reinforced polyimide composition. In a still further aspect, the smoke property is $D_s$ (20). In a yet further aspect, the $D_s$ (20) does not increase by more than about 2 times, more than about 5 times, more than about 7 times, or more than about 10 times. In an even further aspect, the $D_s$ (20) does not increase by more than about 5 times. In a yet further aspect, the flammability property is p(FTP). In a still further aspect, the p(FTP) does not decrease by more than about 2.5%, by more than about 5%, by more than about 7.5%, or more than about 10%. In an even further aspect, the p(FTP) does not decrease by more than about 5%.

In a further aspect, addition of the polyamide flow promoter does not substantially decrease the heat deflection temperature of the polyimide composition, compared to the reference reinforced polyimide composition. In a yet further aspect, the heat deflection temperature does not decrease by more than about 2.5%, by more than about 5%, by more than about 7.5%, more than about 10%, more than about 12.5%, more than about 15%, or more than about 20%. In an even further aspect, the heat deflection temperature does not decrease by more than about 10%.

In a further aspect, addition of the polyamide flow promoter does not substantially decrease either the flex modulus or flex strength of the polyimide composition, compared to the reference reinforced polyimide composition. In a yet further aspect, addition of the polyamide flow promoter does not substantially decrease the flex modulus of the polyimide composition, compared to the reference reinforced polyimide composition. In a still further aspect, addition of the polyamide flow promoter does not substantially decrease the flex strength of the polyimide composition, compared to the reference reinforced polyimide composition. In a yet further aspect, the flex strength does not decrease by more than about 2.5%, by more than about 5%, by more than about 7.5%, more than about 10%, more than about 12.5%, more than about 15%, or more than about 20%. In an even further aspect, the flex strength does not decrease by more than about 10%. In a yet further aspect, the flex modulus does not decrease by more than about 2.5%, by more than about 5%, by more than about 7.5%, more than about 10%, more than about 12.5%, more than about 15%, or more than about 20%. In an even further aspect, the flex modulus does not decrease by more than about 10%.

In a further aspect, addition of the polyamide flow promoter does not substantially decrease either the tensile modulus or tensile strength of the polyimide composition, compared to the reference reinforced polyimide composition. In a further aspect, addition of the polyamide flow promoter does not substantially decrease the tensile modulus of the polyimide composition, compared to the reference reinforced polyimide composition. In a further aspect, addition of the polyamide flow promoter does not substantially decrease the tensile strength of the polyimide composition, compared to the reference reinforced polyimide composition. In a yet further aspect, the tensile strength does not decrease by more than about 10%, by more than about 12%, by more than about 14%, more than about 16%, more than about 18%, more than about 20%, more than about 22%, more than about 24%, or more than about 26%. In an even further aspect, the tensile strength does not decrease by more than about 18%. In a yet further aspect, the tensile modulus does not decrease by more than about 2.5%, by more than about 5%, by more than about 7.5%, more than about 10%, more than about 12.5%, more than about 15%, or more than about 20%. In an even further aspect, the tensile modulus does not decrease by more than about 10%.

In a further aspect, addition of the polyamide flow promoter does not substantially decrease the impact strength of the polyimide composition, compared to the reference reinforced polyimide composition. In a yet further aspect, the impact strength does not decrease by more than about 20%, by more than about 22.5%, by more than about 25%, more than about 27.5%, more than about 30%, more than about 32.5%, more than about 35%, more than about 37.5%, or more than about 40%. In an even further aspect, the impact strength does not decrease by more than about 30%.

The rheological or flow properties of the composition, and thus the improvement in flow property, can be measured by a variety of techniques. Methods to useful for measurement of flow properties are well described in the literature, including, for example, NPL Measurement Note MATC(MN)42, "Guide to the measurement of the flow properties of polymeric materials" (National Physical Laboratories, United Kingdom) and ASTM D7605-10, "Standard Test Method for Thermoplastic Elastomers—Measurement of Polymer Melt Rheological Properties" (ASTM International, U.S.). Methods useful for determining improvement in flow properties of the disclosed compositions include:
 (a) Melt mass or melt volume flow rate (MFR/MVR), see ISO 1133 or ASTM D1238 for pertinent standards related to this method;
 (b) Capillary die/slit die extrusion rheometry, see ISO 11443 for pertinent standards related to this method; and,
 (c) Rotational rheometry, see ISO 3219 for pertinent standards related to this method.

In a yet further aspect, the invention relates to articles made from the disclosed compositions.

In a further aspect, the compositions of the present invention include a polyimide base resin. Useful thermoplastic polyimides have the general formula (I):

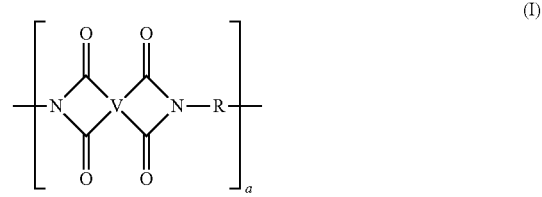

wherein a is greater than or equal to about 10 in one embodiment, and greater than or equal to about 1000 in an alternative embodiment; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. In select embodiments the linkers include, but are not limited to, tetravalent aromatic radicals of formula (II), such as:

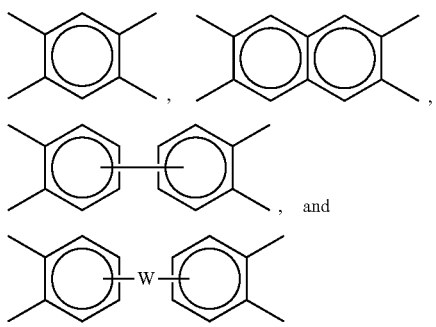

(II)

wherein W is a divalent moiety selected from the group consisting of —O—, —S—, —C(O)—, —SO$_2$—, —SO—, -C$_y$H$_{2y}$- (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III).

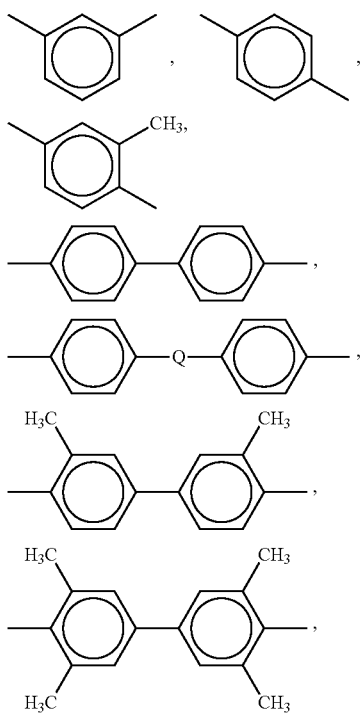

(III)

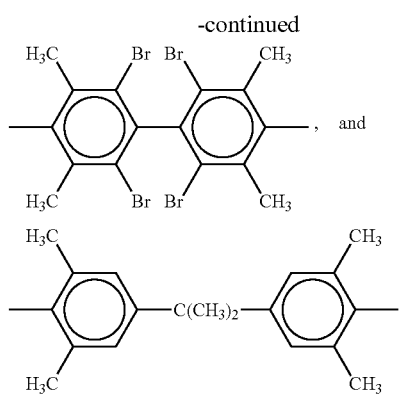

R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV):

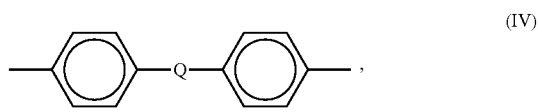

(IV)

wherein Q includes a divalent moiety selected from the group consisting of —O—, —S—, —C(O)—, —SO2—, —SO—, -C$_y$H$_{2y}$- (y being an integer from 1 to 5), and halogenated derivatives thereof, including perfluoroalkylene groups.

In one aspect, polyimides used in the disclosed compositions include polyamidimides, polyetherimides and polybenzimidazoles. In a further aspect, polyetherimides comprise melt processable polyetherimides.

In certain aspects, the polyetherimide polymers include more than 1 structural unit of the formula (V), with alternative embodiments including about 10 to about 1000 or more, and other alternative embodiments including about 10 to about 500 structural units, of the formula (V):

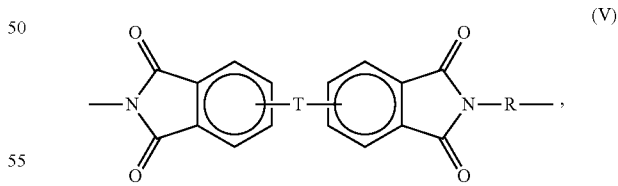

(V)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III) as defined above.

In a further aspect, the polyetherimide may be a copolymer, which, in addition to the etherimide units described above, further contains polyimide structural units of the formula (VI):

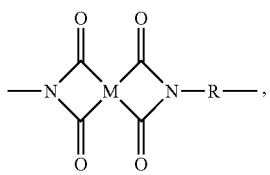
(VI)

wherein R is as previously defined for formula (I) and M includes, but is not limited to, radicals of formula (VII):

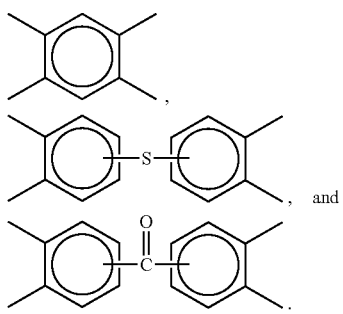
(VII)

The polyetherimide can be prepared by any of the methods including the reaction of an aromatic bis(ether anhydride) of the formula (VIII):

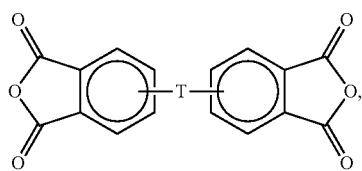
(VIII)

with an organic diamine of the formula (IX):

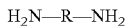
$H_2N$—R—$NH_2$ (IX), wherein T and R are defined as described above in formulas (I) and (IV).

Illustrative examples of aromatic bis(ether anhydride)s of formula (XVIII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VIII) above includes, but is not limited to, compounds wherein T is of the formula (X):

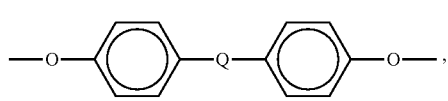
(X)

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl) methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl) benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be present. Beneficial diamino compounds are aromatic diamines, especially m- and p-phenylenediamine and mixtures thereof.

In an exemplary embodiment, the polyetherimide resin includes structural units according to formula (V) wherein each R is independently p-phenylene or m-phenylene or a mixture thereof and T is a divalent radical of the formula (XI):

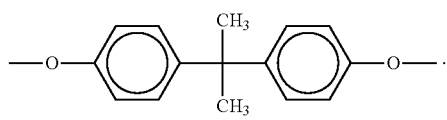
(XI)

In general, the reactions can be carried out employing solvents such as o-dichlorobenzene, m-cresol/toluene, or the like, to effect a reaction between the anhydride of formula (VIII) and the diamine of formula (IX), at temperatures of about 100° C. to about 250° C. Alternatively, the polyetherimide can be prepared by melt polymerization of aromatic bis(ether anhydride)s of formula (VIII) and diamines of formula (IX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis(ether anhydride). The polyetherimide polymers can optionally be prepared from reaction of an aromatic bis(ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (μeq/g) acid titratable groups in one embodiment, and less than about 10 μeq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

Generally, useful polyetherimides have a melt index of about 0.1 to about 10 grams per minute (g/min), as measured by American Society for Testing Materials (ASTM) D1238 at 295° C., using a 6.6 kilogram (kg) weight. In one embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), and beneficially about 0.35 to about 0.7 dl/g measured in m-cresol at 25° C.

In another aspect, the compositions of the present invention include a reinforcing agent or filler. Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boronsilicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper, tungsten and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, hemp, cotton, sisal, jute, starch, cork flour, lignin, ground nut shells, corn, rice grain husks or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

In a further aspect, suitable fillers include reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about 0.12" (3 mm) to about 0.51" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercap to functionalized silanes. Organo metallic coupling agents, for example, titanium or zirconium based organo metallic compounds, may also be used. Other preferred sizing-coated glass fibers are commercially available from Owens Corning Fiberglass as, for example, OCF K filament glass fiber 183F.

In one aspect, the reinforcing filler is a glass fiber, although other reinforcing fillers may also be used such as glass flake, glass beads, carbon fiber and/or aramid fiber. In exemplary embodiments, the glass fiber used in the invention may be selected from E-glass, S-glass, AR-glass, T-glass, D-glass and R-glass. The diameter of the fiber may range from 5 to 35 μm. In an alternative embodiment, the diameter of the glass fibers may range from 10 to 20 μm. In this area where a thermoplastic resin is reinforced with glass fibers in a composite form, fibers having a length of 0.4 mm are generally referred to long fibers, and shorter ones are referred to short fibers. In alternative embodiments of the present invention, the fibers have a length of 1 mm or longer. In a further aspect, the fibers have a length of 2 mm or longer.

The glass fiber used in select aspects of the invention may, in alternative embodiments, be surface-treated with a surface treatment agent containing a coupling agent. Suitable coupling agents include, but are not limited to, silane-based coupling agents, titanate-based coupling agents or a mixture thereof. Applicable silane-based coupling agents include aminosilane, epoxysilane, amidesilane, azidesilane and acrylsilane.

The amount of reinforcing filler used in the polyimide composition is dependent on one more factors including, but not limited to, the thermoplastic resin used, the type of reinforcing filler used, the type of polyamide flow promoter used, and/or the presence of any other additives or fillers. In one embodiment, the amount of reinforcing filler is from 10 to 60% by weight of the polyimide composition. In another embodiment, the amount of reinforcing filler is from 15 to 50% by weight of the polyimide composition. In still another embodiment, the amount of reinforcing filler is from 20 to 40% by weight of the polyimide composition.

In one aspect, the compositions of the present invention include a polyamide flow promoter. In a further aspect, the polyamide flow promoter is prepared from polymerization of an organic lactam, an amino acid, or a reaction comprising a dicarboxylic acid and a diamine. In a still further aspect, the dicarboxylic acid is an aromatic dicarboxylic acid. In a yet further aspect, the aromatic dicarboxylic acid is terephthalic acid. In an even further aspect, the dicarboxylic acid is an aliphatic carboxylic acid. In a further aspect, the disclosed compositions comprise at least one polyamide flow promoter. In a still further aspect, the disclosed compositions comprise two or more polyamide flow promoters.

In a further aspect, the polyamide flow promoter is derived from the polymerization of organic lactams having from 4 to 12 carbon atoms. In a still further aspect, the lactams are represented by the formula (XII)

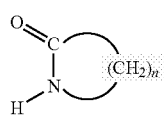
(XII)

wherein n is about 3 to about 11. In a further aspect, the lactam is epsilon-caprolactam having n equal to 5.

Polyamides may also be synthesized from amino acids having from 4 to 12 carbon atoms. In certain embodiments the amino acids are represented by the formula (XIII)

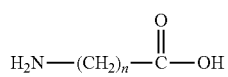
(XIII)

wherein n is about 3 to about 11. In one embodiment, the amino acid is epsilon-aminocaproic acid with n equal to 5.

In a further aspect, polyamide flow promoters are polymerized from aliphatic dicarboxylic acids having from 4 to 12 carbon atoms and aliphatic diamines having from 2 to 12 carbon atoms. In a still further aspect, the aliphatic diamine is hexamethylenediamine ($H_2N(CH_2)_6NH_2$). It is beneficial that the molar ratio of the dicarboxylic acid to the diamine be about 0.66 to about 1.5. Within this range it is generally beneficial to have the molar ratio be greater than or equal to about 0.81 in one embodiment, or greater than or equal to about 0.96 in an alternative embodiment. Also beneficial within this range is an amount of less than or equal to about 1.22 in one embodiment, or less than or equal to about 1.04 in another embodiment. In a still further aspect, suitable polyamides include, for example, those described in U.S. Pat. Nos. 2,071,250; 2,071,251; 2,130,523; 2,130,948; 2,241,322; 2,241,322; 2,312,966; 2,512,606; and 3,393,210.

In a further aspect, the polyamide flow promoter is a semi-aromatic polyamide. Semiaromatic polyamides are known in the art. Suitable polyamides and methods of production include, for example, those described in U.S. Pat. Nos. 5,378,800; 5,322,923; 5,424,104; Re. 34,447; and 6,140,459. The thermoplastic semiaromatic polyamide may be one or more homopolymers, copolymers, terpolymers, or higher polymers that are derived in part from monomers that contain divalent aromatic groups. It may also be a blend of one or more aliphatic polyamides with one or more homopolymers, copolymers, terpolymers, or higher polymers that are derived in part from monomers containing divalent aromatic groups.

In a further aspect, monomers containing divalent aromatic groups are selected from are terephthalic acid and its derivatives, isophthalic acid and its derivatives, and m-xylylenediamine. The semiaromatic polyamide may optionally contain repeat units derived from one or more additional aliphatic dicarboxylic acid monomers or their derivatives, such as adipic acid, sebacic acid, azelaic acid, dodecanedioic acid, and other aliphatic or alicyclic dicarboxylic acid monomers having 6 to 20 carbon atoms. As used herein, "alicyclic" means a divalent non-aromatic hydrocarbon group containing a cyclic structure therein.

The semiaromatic polyamide may optionally contain repeat units derived from one or more aliphatic or alicyclic diamine monomers having 4 to 20 carbon atoms. In a further aspect, aliphatic diamines may be linear or branched and include hexamethylenediamine; 2-methyl-1,5-pentanediamine; 1,8-diaminooctane; 1,9-diaminononane; methyl-1,8-diaminooctane; 1,10-diaminodecane; and 1,12-diaminododecane. Examples of alicyclic diamines include 1-amino-3-aminomethyl-3,5,5,-trimethylcyclohexane; 1,4-bis(aminomethyl)cyclohexane; and bis(p-aminocyclohexyl)methane.

The semiaromatic polyamide may optionally contain repeat units derived from lactams and aminocarboxylic acids (or acid derivatives), such as caprolactam, 11-aminoundecanoic acid, and laurolactam.

In a further aspect, the polyamide flow promoter is selected from nylon 6, nylon 66, polyphthalamide, or a combination including at least one of the foregoing polyamide flow promoters. In an even further aspect, the polyamide flow promoter is selected from polyamide 6 and polyamide 6,6. In a further aspect, the polyamide flow promoter is polyamide 6. In a still further aspect, the polyamide flow promoter is polyamide 6,6. In an even further aspect, the polyamide flow promoter is polyphthalamide.

In a further aspect, the polyamide flow promoter is selected from nylon 11, nylon 12, nylon 12/12 and related. In a yet further aspect, the polyamide flow promoter is selected from polyamide 6/66, polyamide 6/610, polyamide 6/12, polyamide 6/46, and the like. In a yet further aspect, the polyamide flow promoter is selected from poly(tetramethylene adipamide) (polyamide 4,6), poly(hexamethylene adipamide) (polyamide 6,6), poly(hexamethylene azelaamide) (polyamide 6,9), poly(hexamethylene sebacamide) (polyamide 6,10), poly(hexamethylene dodecanoamide) (polyamide 6,12), bis(para-aminocyclohexyl)methane dodecanoamide, and the like. In a still further aspect, the polyamide flow promoter is an amorphous or low crystallinity polyamides.

In a further aspect, the polyamide flow promoter is a semi-aromatic polyamides such as poly(m-xylylene adipamide) (polyamide MXD,6); hexamethylene adipamide/hexamethylene terephthalamide copolyamide (polyamide 6,T/6,6); hexamethylene terephthalamide/2-methylpentamethylene terephthalamide copolyamide (polyamide 6,T/D,T); poly(dodecamethylene terephthalamide) (polyamide 12,T); poly(decamethylene terephthalamide) (polyamide 10,T); decamethylene terephthalamide/decamethylene dodecanoamide copolyamide (polyamide 10,T/10,12); poly(nonamethylene terephthalamide) (polyamide 9,T); the polyamide of hexamethylene isophthalamide and hexamethylene adipamide (polyamide 6,I/6,6); the polyamide of hexamethylene terephthalamide, hexamethylene isophthalamide, and hexamethylene adipamide (polyamide 6,T/6,I/6,6); and copolymers and mixtures of these polymers.

The amount of polyamide flow promoter used in the present invention is dependent on one more factors including, but not limited to, the thermoplastic resin used, the type of reinforcing filler used, the type of polyamide flow promoter used, and/or the presence of any other additives or fillers. In one embodiment, the amount of polyamide flow promoter is from 1 to 10% by weight of the polyimide composition. In another embodiment, the amount of reinforcing filler is from 2 to 8% by weight of the polyimide composition. In still another embodiment, the amount of reinforcing filler is from 3 to 6% by weight of the polyimide composition.

In addition, the compositions of the present invention may include one or more additives. The additive may include, but are not limited to, fillers, antioxidants, lubricants, flame retardants, nucleating agents, coupling agents, ultraviolet absorbers, ultraviolet stabilizers, pigments, dyes, plasticizers, processing aids, viscosity control agents, tackifiers, anti-blocking agents, surfactants, extender oils, metal deactivators, voltage stabilizers, boosters, catalysts, smoke suppressants and the like, or a combination containing at least one of the foregoing, depending on the final selected characteristics of the compositions. Examples of additives, fillers and the like that may be used in the present invention include, but are not limited to, glass fibers, mineral fillers, and the like, or a combination containing at least one of the foregoing.

Examples of nucleating agents include, but are not limited to, talc, silica, mica, kaolin, sorbitol, sodium benzoate, sodium stearate, and the like, or a combination containing at least one of the foregoing.

Examples of antioxidants include, but are not limited to, hindered phenols such tetrakis[methylene(3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy)hydrocinnamate, octadecyl-3(3.5-di-tert.butyl-4-hydroxyphenyl)proprionate, pentaerythritol tetrakis(3(3.5-di-tert.butyl-4-hydroxyphenyl)proprionate), phosphites and phosphonites such as tris(2,4-di-tert-butylphenyl)phosphite and thio compounds such as dilaurylthiodipropionate, dimyristylthiodipropionate, and distearylthiodipropionate, potassium iodide, cuprous iodide, various siloxanes, and amines such as polymerized 2,2,4-trimethyl-1,2-dihydroquinoline and the like, or a combination containing at least one of the foregoing.

Examples of flame retardants include, but are not limited to, halogenated flame retardants, like tretabromo bisphenol A oligomers such as BC58 and BC52, brominated polystyrene or poly(dibromo-styrene), brominated epoxies, decabromo-diphenyleneoxide, pentabrombenzyl acrylate monomer, pentabromobenzyl acrylate polymer, ethylene-bis(tetrabromophthalimide, bis(pentabromobenzyl)ethane, metal hydroxides like $Mg(OH)_2$ and $Al(OH)_3$, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N-(N'-benzylaminocarbonyl) sulfanylimide potassium salt, or a combination containing at least one of the foregoing. Fillers and additives may be added in amounts ranging from 0.1 to about 40% by weight percent of the total composition.

It is also understood that the compositions of the present encompass reaction products of the above-described compositions.

The disclosed polyimide compositions can be readily formed using any known method in the art of dispersing one or more fillers in a thermoplastic resin. The thermally conductive and electrically insulative compositions or composites can generally be processed by a melt compounding process or solution blending process.

Melt blending of the moldable composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces can be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines.

In one embodiment, the organic polymer in powder form, pellet form, sheet form, or the like, can be first dry blended with the fillers in a Henschel or in a roll mill, prior to being fed into a melt blending device such as an extruder or Buss kneader. It can be desirable to introduce the fillers into the melt blending device in the form of a masterbatch. In such a process, the masterbatch can be introduced into the melt blending device downstream of the point where the organic polymer is introduced.

A melt blend is one where at least a portion of the organic polymer has reached a temperature greater than or equal to about the melting temperature, if the resin is a semi-crystalline organic polymer, or the flow point (e.g., the glass transition temperature) if the resin is an amorphous resin during the blending process. A dry blend is one where the entire mass of organic polymer is at a temperature less than or equal to about the melting temperature if the resin is a semi-crystalline organic polymer, or at a temperature less than or equal to the flow point if the organic polymer is an amorphous resin and wherein organic polymer is substantially free of any liquid-like fluid during the blending process. A solution blend, as defined herein, is one where the organic polymer is suspended in a liquid-like fluid such as, for example, a solvent or a non-solvent during the blending process.

The moldable composition comprising the organic polymer and fillers can be subject to multiple blending and forming steps if desirable. For example, the moldable composition can first be extruded and formed into pellets. The pellets can then be fed into a molding machine where it can be formed into any desirable shape or product. Alternatively, the moldable composition emanating from a single melt blender can be formed into sheets or strands and subjected to post-extrusion processes such as annealing, uniaxial or biaxial orientation.

In one aspect, the fillers can first be dry blended together with any foregoing mentioned additives, then fed into an extruder from one or multi-feeders, or fillers separately feed into extruder from one or multi-feeders. The organic polymer resin or any polymer combination can be, in one aspect, in powder or pellet form, and can be first dry blended with each other, or dry blended with any combination of the foregoing mentioned fillers, then fed into an extruder from one or multiple-feeders. The fillers used in the invention can also be first processed into a masterbatch, and then fed into an extruder.

The feeding of organic polymers, fillers, masterbatch or any combination of polymers, fillers blends can be fed into an extruder from a throat hopper or any side feeders on the extruder.

The extruders used in the invention can have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing. The melt blending of the composites involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the organic polymer has reached a temperature greater than or equal to about the melting temperature, if the resin is a semicrystalline organic polymer, or the flow point (e.g., the glass transition temperature) if the resin is an amorphous resin.

Solution blending can also be used to manufacture the moldable composition. The solution blending can also use additional energy such as shear, compression, ultrasonic vibration, or the like, to promote homogenization of fillers with the organic polymer. In one embodiment, an organic polymer suspended in a fluid can be introduced into an ultrasonic sonicator along with any foregoing fillers. The mixture can be solution blended by sonication for a time period effective to disperse the fillers into the organic polymers. The organic polymer along with the fillers can then be dried, extruded and molded if desired.

The moldable composition comprising the organic polymer, fillers, and optional additives can be subject to multiple blending and forming steps if desirable. For example, the moldable composition can first be extruded and formed into pellets. The pellets can then be fed into a molding machine where it can be formed into any desirable shape or product. Alternatively, the moldable composition emanating from a single melt blender can also be formed into sheets or strands and subjected to post-extrusion processes such as annealing, uniaxial or biaxial orientation.

The polymeric compositions can be formed into moldable stock material or moldable articles using techniques known to those in the art.

The composition can be extruded into granules or pellets, cut into sheets or shaped into briquettes for further downstream processing. The composition can then be molded in equipment generally employed for processing polyimide compositions, e.g., an injection-molding machine.

The compositions of the present invention may be made into articles using common processes such as film and sheet extrusion, injection molding, gas-assisted injection molding, extrusion molding, compression molding and blow molding. The composition may be used to prepare molded articles such as durable articles, structural products, and electrical and electronic components, and the like.

It is contemplated that the compositions of the invention can be used in a variety of articles wherein the enhanced flow properties are useful or desirable in the manufacturing of such articles. For example, in one aspect, the invention relates to articles comprising the disclosed reinforced polyimide compositions comprising a reinforcing filler, a polyamide flow promoter, and a polyimide resin. In a further aspect, the articles include digital recording media and electronic storage devices. In a yet further aspect, the invention relates to articles comprising the disclosed compositions, wherein the article is circular and has a diameter ranging from about 2 cm to about 5 cm. In a still further aspect, the circular article has a thickness from about 0.5 mm to about 2 mm.

In a further aspect, the invention relates to a disk drive comprising a disk; and, an article enclosing at least one surface of the disk, wherein the article comprises the disclosed compositions. In a still further aspect, the invention relates to a disk drive comprising a) a disk; b) a disk enclosure enclosing at least one surface of the disk, wherein the disk enclosure comprises the disclosed compositions; and, c) a head actuated over the disk, wherein the head comprises: i) a read element; ii) a write element; iii) a preamp; and iv) an interconnect, wherein the interconnect comprises: 1) a first transmission line; 2) a second transmission line coupling the head to the preamp, and, 3) a compensation network operable to compensate for an impedance discontinuity in the first and second transmission lines; wherein the compensation network comprises: a) a first trace; and, b) a second trace connected in parallel with the first and second transmission lines, wherein a shape of the first and second traces varies to form at least a first capacitor.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

As used herein below, the following are abbreviated as follows:
FM is flex modulus;
FOT is flame-out time;
FS is flex strength;
GF is glass fiber;
HDT is heat deflection temperature;
ISO refers to International Organization for Standardization, Geneva, Switzerland;
PA is polyamide;
PA6 is polyamide 6, which is also referred to in the art as nylon 6 or polycaprolactam;
PA66 is polyamide 6,6, which is also referred to in the art as nylon 6,6;
p(FTP) is the probability of first time pass;
PPA is polyphthalimide;
TM is tensile modulus;
TS is tensile strength;
UNI is Unnotched Impact Strength; and
Zytel is Zytel® HTN 501, a commercially available aromatic polyamide resin from DuPont.

Example 1

The following materials were used in the examples described herein: polyimide was either Ultem® 1010 and Ultem® 1040 (SABIC Innovative Plastics); glass fiber was PPG 3540 (PPG Industries, Inc.), and is indicated as "GF" in figures and tables; polyamide PA6 was Domamid® 24 (DOMO Chemicals GmbH) and is indicated as "PA6" in the figures and tables; polyamide PA66 was Zytel® 501 (Dupont) and is indicated as PA66 in the figures and tables; polyamide PPA was Amodel® A-1006 (Solvay Plastics), and is indicated as "PPA" in the figures and tables; and, high temperature nylon was Zytel® HTN (Dupont), and is indicated as "Zytel" in the figures and tables. These materials were formulated into compositions in the proportions set forth below in Tables 1 and 2.

The compounding was done using PET screw with the temperature profile and screw design as shown in FIG. 1. For twin-screw extrusion through a 10-barrel extruder—the batches in Table 1 were weighed separately excluding glass fiber. The Glass fiber was fed through a separate side-feeder at the 6th barrel as shown in FIG. 1. The feeders were duly calibrated for 40% glass fiber feeding. Molding was done in 100T L&T Demag Injection Molding machine (L&G Plastics Machinery Ltd, Chennai, India). The set of temperature was kept as shown in Table 3 and specific molding parameters set are shown in Table 4.

TABLE 1

| Ingredient | Batch Number* | | | | | | | | | | |
|---|---|---|---|---|---|---|---|---|---|---|---|
| | 1 | 2 | 3 | 4 | 5 | 6 | 7 | 8 | 9 | 10 | 11 |
| Ultem 1010 | 60 | 30 | 59 | 57.5 | 55 | 50 | 59 | 57.5 | 55 | 50 | 59 |
| Ultem 1040 | | 30 | | | | | | | | | |
| PA6 | | | 1 | 2.5 | 5 | 10 | | | | | |
| PA66 | | | | | | | 1 | 2.5 | 5 | 10 | |
| PPA | | | | | | | | | | | 1 |
| GF | 40 | 40 | 40 | 40 | 40 | 40 | 40 | 40 | 40 | 40 | 40 |
| Total | 100 | 100 | 100 | 100 | 100 | 100 | 100 | 100 | 100 | 100 | 100 |

*Amounts provided in weight %.

TABLE 2

| Ingredient | Batch Number* | | | | | | | | | | |
|---|---|---|---|---|---|---|---|---|---|---|---|
| | 12 | 13 | 14 | 15 | 16 | 17 | 18 | 19 | 20 | 21 | 22 |
| Ultem 1010 | 58 | 55 | 50 | 30 | 20 | 58 | 55 | 50 | 45 | 90 | 85 |
| Ultem 1040 | | | | | | | | | | | |
| PA6 | | | | | | | | | | | |
| PA66 | | | | | | | | | | | |
| PPA | 2.5 | 5 | 10 | 30 | 40 | | | | 5 | | 5 |
| Zytel | | | | | | 2.5 | 5 | | | | |
| GF | 40 | 40 | 40 | 40 | 40 | 40 | 40 | 50 | 50 | 10 | 10 |
| Total | 100 | 100 | 100 | 100 | 100 | 100 | 100 | 100 | 100 | 100 | 100 |

*Amounts provided in weight %.

TABLE 3

| | Zone | | | | | |
|---|---|---|---|---|---|---|
| | Nozzle | MH3 | MH2 | MH1 | Feed | Oil |
| Temperature (° C.) | 340 | 330 | 330 | 320 | 70 | 40 |

TABLE 4

| Parameter | Value |
|---|---|
| Mold Temperature (° C.) | 140 |
| Injection Pressure (bar) | 60 |
| Injection Speed (%) | 55 |
| Holding Pressure (bar) | 40 |
| Screw speed (rpm) | 100 |
| Holding time (sec) | 12 |
| Cooling time (sec) | 20 |
| Dosing (mm) | 55 |

Tensile, Impact and Flame bars were molded as per ISO standards and were conditioned at 23° C./50% humidity for 48 hrs prior to testing. After conditioning the various properties (mechanicals, thermal, rheological, flame and electrical) were measured as described in the examples. The test specimens were injection molded according to ISO 294 and tensile, flexural and impact tests were done according to ISO standard 527, 178 and 180 respectively. Flame tests were done according to UL Standard 94 using 20 mm Vertical Burning Test.

Example 2

Figure 2:
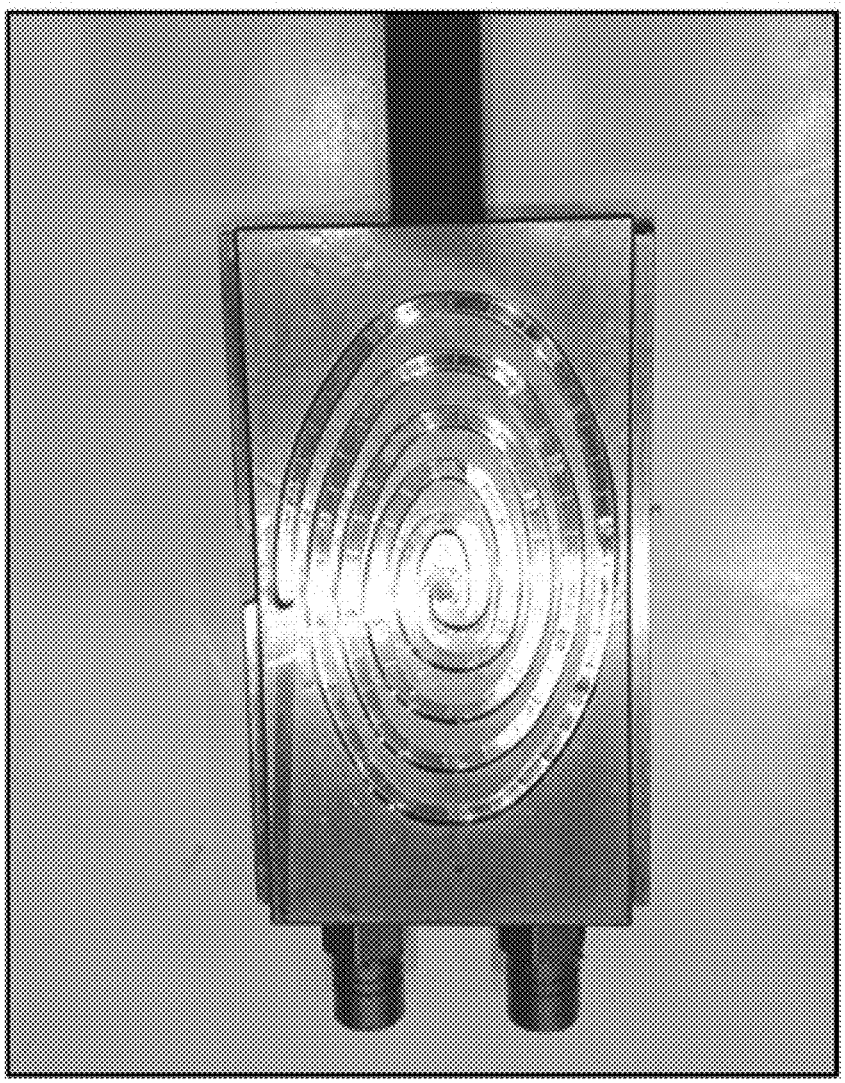
FIG. 2 shows a photograph of a representative apparatus for determination of the linear flow properties of exemplary disclosed compositions.

Flow properties of the compositions were determined by spiral flow injection molding. The mold has engraved numbers in it along the channel (3 mm thickness) through which polymer flows, thus providing directly the flow numbers. The mold used in these studies is shown in FIG. 2. The spiral flow conditions during injection molding are given below in Table 5. Baseline flow for Ultem-40% GF was 25 cm.

TABLE 5

| Spiral Flow Molding conditions | Value |
|---|---|
| Mold Temperature (° C.) | 140 |
| Injection Pressure (bar) | 55 |
| Injection Speed (mm/sec) | 55 |
| Holding Pressure (bar) | 50 |
| Holding Pressure (bar) | 5 |
| Screw speed (rpm) | 80 |
| Holding time (sec) | 12 |
| Cooling time (sec) | 15 |
| Thickness of mold (mm) | 3 |

Figure 3:
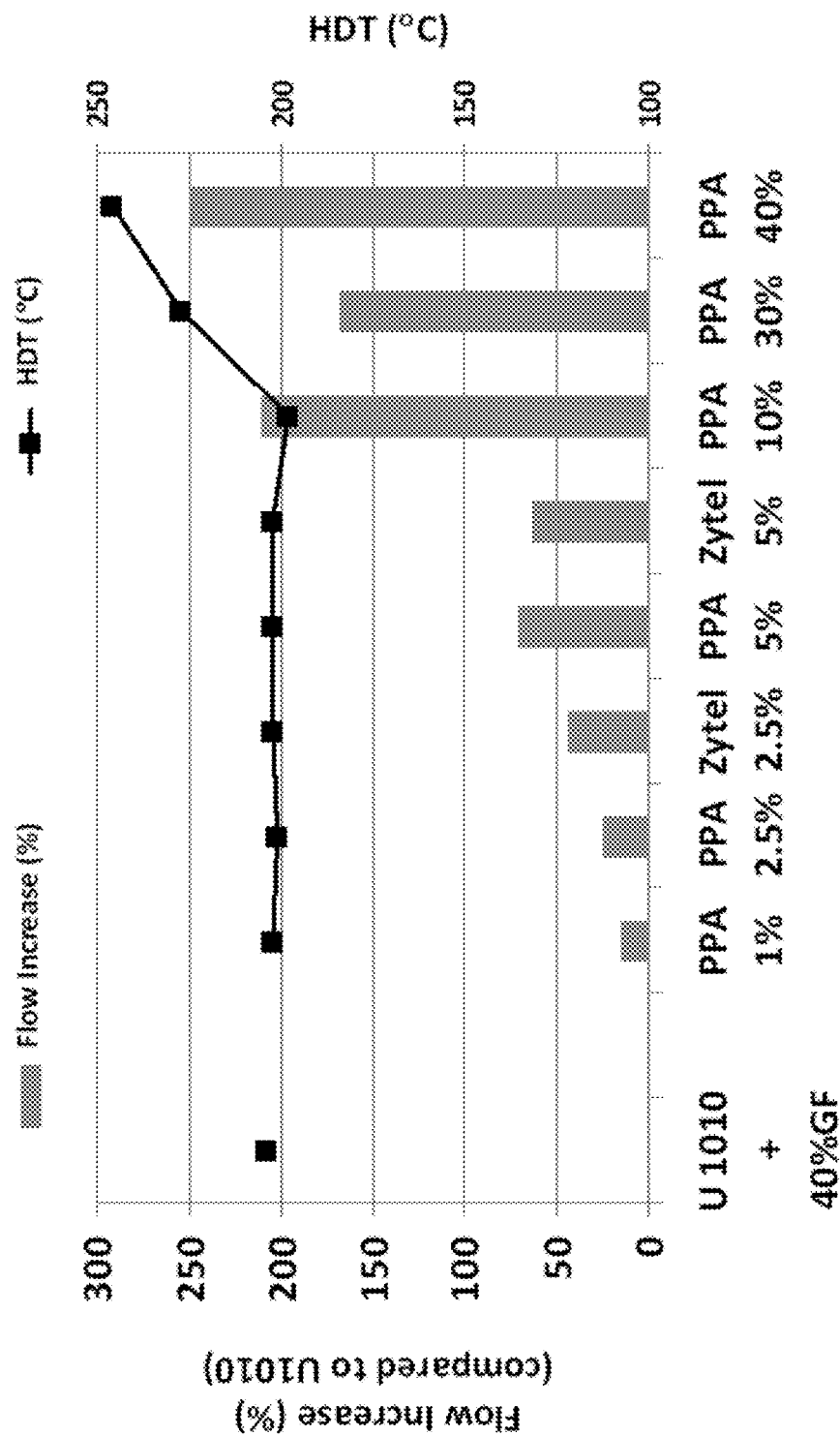
FIG. 3 shows representative linear flow and HDT data for exemplary compositions.
Figure 4:
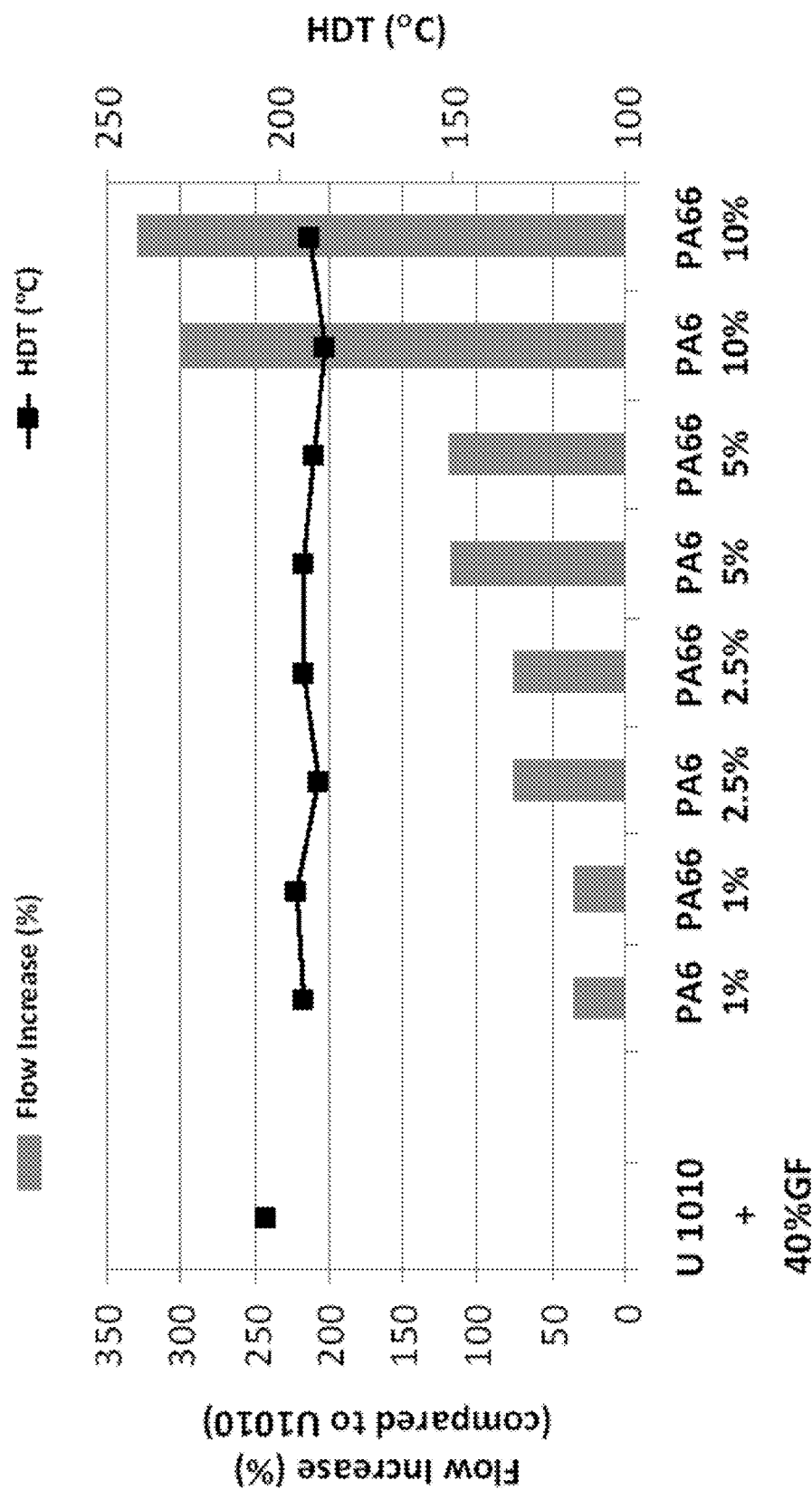
FIG. 4 shows representative linear flow and HDT data for exemplary compositions.

Data for effect of polyamide flow promoters is shown in FIGS. 3 and 4, which show, respectively, the results obtained with aromatic polyamides (PPA and Zytel; see FIG. 3) and aliphatic polyamides (PA6 and PA66; see FIG. 4). The amount of polyamide in the composition is shown in the figures as percentage for wt %. All compositions contained 40% GF (PPG Industries), and the amount of polyimide (Ultem 1010) in the composition was the balance required to provide 100% after accounting for the polyamide and GF. The data show that the aliphatic polyamides tested provided greater increases in flow improvement compared to the aromatic polyamides tested. The flow improvement is given in terms of percentage increase in flow compared to a composition comprising Ultem 1010 and 40% GF.

The data show that the aliphatic nylons tested lowered HDT by 10-15° C. On the other hand, the aromatic nylons tested maintained the HDT. For example, PPA at 5 wt % provided a 70% increase in flow and Zytel at the same loading provided a 63% flow improvement compared to the reference composition (60% Ultem 1010, 40% GF without a polyamide flow promoter). The aliphatic polyamides tested provided a more robust effect on flow improvement compared to similar loadings of the aromatic polyamides, but with a loss in HDT of up to 15° C. For example, at 5% loading both types of aliphatic polyamides (PA6 and PA66) behaved similarly with regard to improved flow. PPA, at 10% in the composition, provided a flow improvement of 200%, whereas PA6 and PA66 showed more than a 300% improvement in flow with respect to reference composition (60% Ultem 1010, 40% GF).

Example 3

Figure 5:
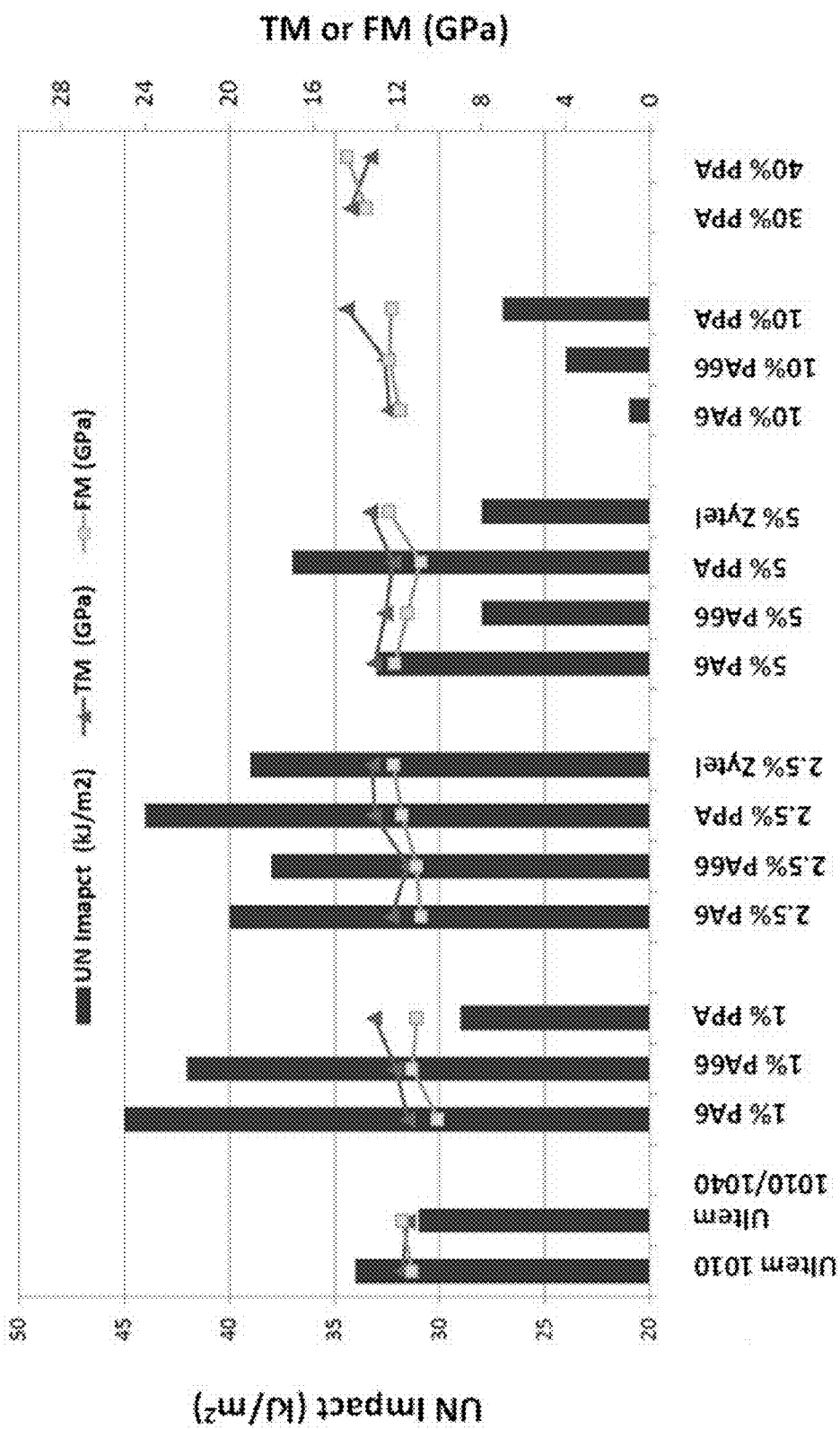
FIG. 5 shows representative tensile modulus, flex modulus, and impact data for exemplary compositions.

The data pertaining to the effect of a polyamide flow promoter on TM, FM, and impact properties are shown in FIG. 5. The TM, FM, and impact properties were tested using procedures described in ISO standard 527, 178 and 180 respectively on injection molded test specimens. It should be noted for FIG. 5 that the composition labeled "Ultem 1010" was 60% Ultem/40% GF (wt %), and the composition label "Ultem 1010/1040" was 30% Ultem 1010/30% Ultem 1040/40% GF (wt %). The data show that the presence of a polyamide flow promoter (PA6, PA66, PPA, or Zytel) in the compositions tested had minimal impact on either tensile or flex modulus. The compositions containing a polyamide flow promoter had TM or FM at the same or slightly higher level compared to the comparable reference composition (i.e. comparable ratios of polyimide, Ultem, and GF without a polyamide flow promoter). The trend is similar for the effect on impact properties, except that the addition of 5% PPA in a composition containing 10 and 50% GF with polyimide (Ultem) reduced the impact property.

Figure 6:
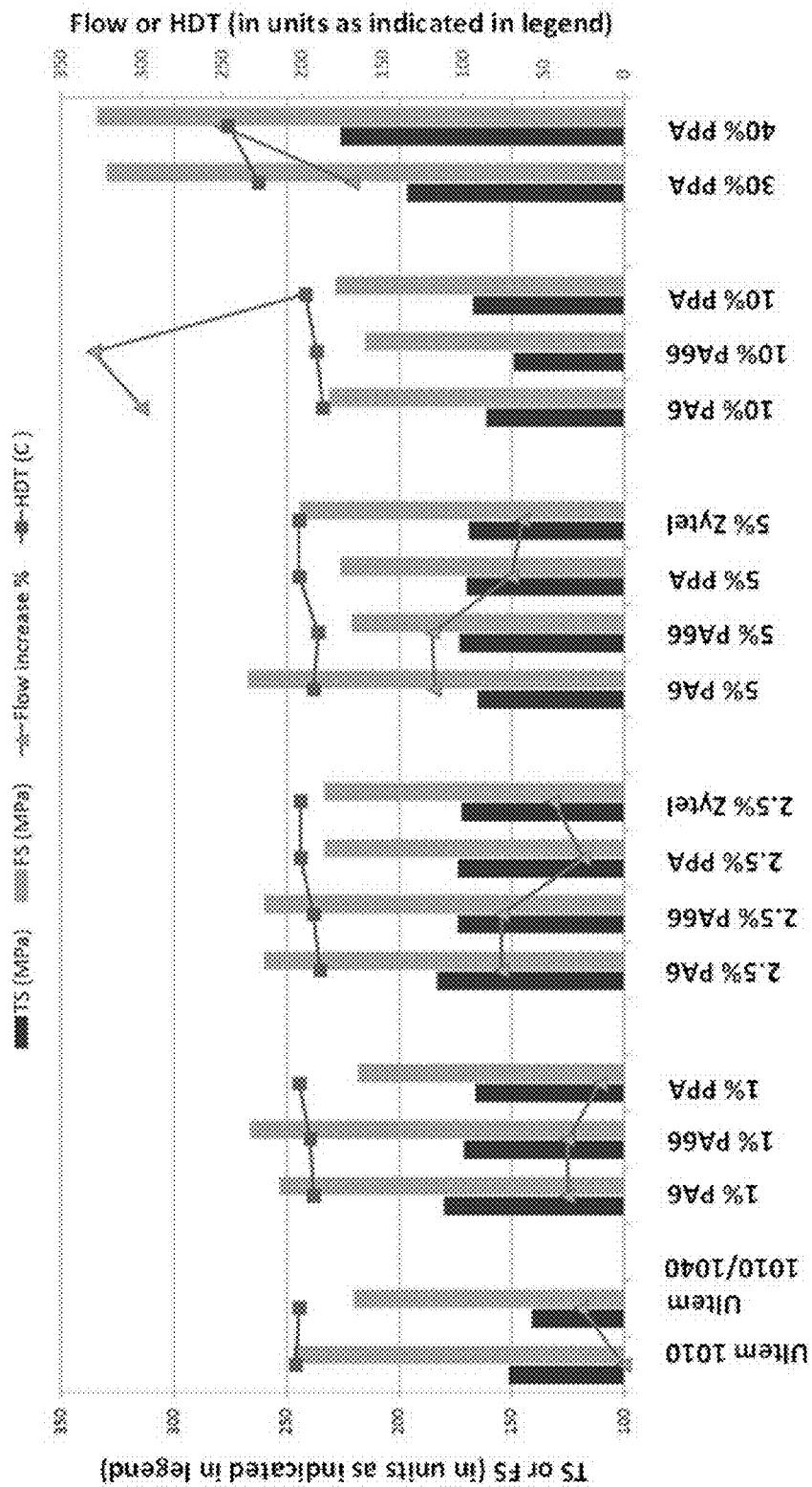
FIG. 6 shows representative tensile strength, flex strength, HDT, and linear flow data for exemplary compositions.

The data pertaining to the effect of a polyamide flow promoter on TS, FS, HDT, and flow increase are shown in FIG. 6. The data show that the presence of a polyamide flow promoter (PA6, PA66, PPA, or Zytel) provided materials with a similar or slightly improved TS and FS in the batches tested. The greatest improvement in TS and FS was realized with a composition containing 30% or 40% PPA. When the polyamide flow promoter was an aliphatic polyamide (PA6 or PA66), a 13-18° C. decrease in HDT was observed in the batches tested. In contrast, when the polyamide flow promoter was an aromatic polyamide (PPA or Zytel), the HDT either did not change or showed an improvement. For example, 30% or 40% PPA provided a 20-40° C. increase in HDT when compared to the appropriate reference composition (60% Ultem, 40% GF). A similar trend is seen when the composition contained 10% or 50% GF with 5% PPA compared to the reference composition. For example, 5% PPA in a composition containing 10% GF provided a 10% improvement in flow without appreciably affecting the TS, FS, or HDT. Similarly, 5% PPA in a composition containing 50% GF provided a 109% improvement in flow with impacting either TS, FS or HDT.

Example 4

Figure 7:
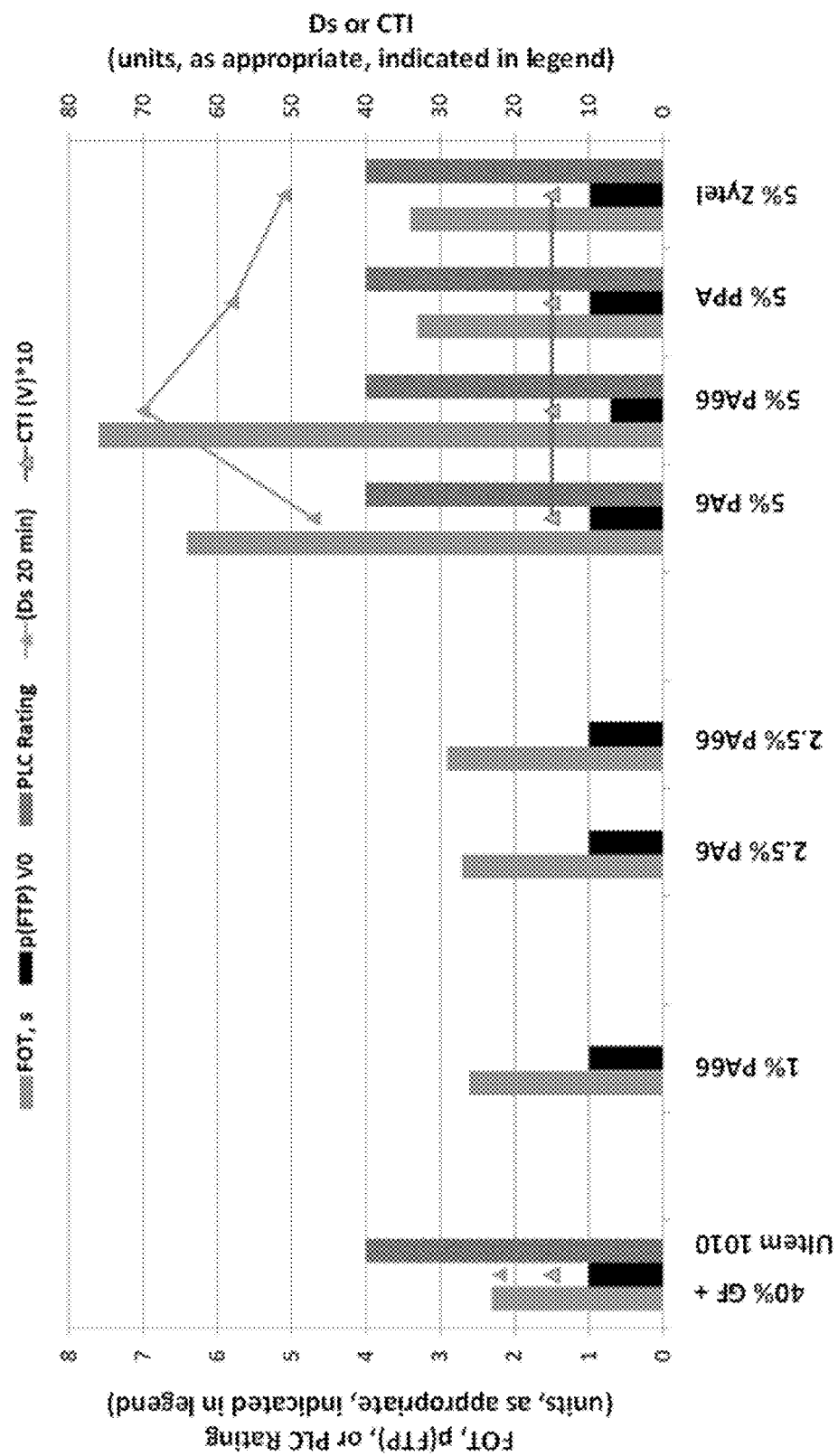
FIG. 7 shows representative flame and heat property data for exemplary compositions.

Flammability testing was carried out to determine the effect of the inclusion of a polyamide flow promoter on the baseline properties of a polyimide/GF composition. The reference composition was 60% Ultem 1010/40% GF. Ultem 1010 is a self-extinguishable polymer and is frequently used in flame retardant applications. Compositions comprising both aliphatic with aromatic polyamide flow promoters were tested, and the data are shown in FIG. 7.

The test procedure followed is described in the UL94 flame testing procedure ("Standard for Tests for Flammability of Plastic Materials for Parts in Devices and Appliances"; Underwriters Laboratories, Inc.). Tests were conducted in Atlas HVUL cabinet (HVUL 14095 and HVUL 14111; Atlas Material Testing Technology (India) Private Limited, Chennai, India) with an exhaust fan attachment to remove combustion products after each test and software controlled calibrated timing device with audio signal. All the tests were conducted in an environment of 23±2° C., 50±5% relative humidity. The samples were conditioned at 23° C. /50% humidity for 48 hours prior to testing. The testing procedure was routinely carried out such that 10 flame bars were tested and the average value reported as average flame-out time (FOT) in seconds. The rating criteria according to UL94 standard are as follows: 1) V0(vertical burn): burning stops within 10 seconds after two applications of 10 seconds each of a flame to a test bar with no flaming drips are allowed; 2) V1 (vertical burn): burning stops within 30 seconds after two applications of 10 seconds each of a flame to a test bar with no flaming drips are allowed; and, 3) V2 (vertical burn): burning stops within 30 seconds after two applications of 10 seconds each of a flame to a test bar with flaming drips are allowed. In addition to the UL94 rating, the flame-out time was analyzed using a DFSS six sigma approach to calculate probability of first time pass or p(FTP), wherein p(FTP) is as defined in the UL94 protocol.

The flammability properties of the compositions containing a polyamide flow promoter were comparable to the reference composition (60% polyimide (Ultem), 40% GF) up to a level of about 2.5% aliphatic polyamide (e.g. PA6 or PA66). At levels above about 2.5%, an increase in FOT was observed. In contrast, when the polyamide flow promoter was an aromatic polyamide (e.g. PPA or Zytel), FOT was comparable to the reference composition even up to the loading of about 5%. If the aromatic polyamide was present at levels of above about 5%, an increase in FOT was observed similar to that observed when the aliphatic polyamide was present at about 5%.

Smoke testing was carried out in a smoke chamber comprising a closed cabinet with a furnace and a light source with a detector as per ASTM E standards. The smoke testing protocol was carried out as described in the ASTM E-622 smoke density test (ASTM E622-94, 1999, "Guide for Developing Computerized System," ASTM International, West Conshohocken, Pa., 2003, DOI: 10.1520/E0622-94R99, www.astm.org.). Data are given in terms $D_s(20)$ values, i.e. the specific optical density at 20 minutes. The polyimide Ultem is known for excellent smoke resistance properties. It was of interest to determine the effect of inclusion of a polyamide flow promoter in the composition on the smoke properties due to the lower melting point typical of the polyamide flow promoters. Data are shown in FIG. 7.

The reference composition was 60% Ultem 1010/40% GF, which was associated with a low Ds value, e.g. Ds (20) was about 21. Similar trends as observed for flammability testing were also observed for smoke testing. For example, when polyamide flow promoter was an aromatic polyamide at 5% loading, the observed Ds value was about 22% lower when compared to compositions containing an aliphatic polyamide flow promoter.

Example 5

The Comparative Tracking Index ("CTI") is typically used in the art to measure the electrical breakdown (tracking) properties of an insulating material. Tracking is a measure of electrical breakdown on the surface of an insulating material. A large voltage difference gradually creates a conductive leakage path across the surface of the material by forming a carbonized track. The CTI testing procedure was carried as described in ASTM D3638 test method (ASTM D3638, 2007, "Standard Test Method for Comparative Tracking Index of Electrical Insulating Materials," ASTM International, West Conshohocken, Pa., 2003, DOI: 10.1520/D3638-07, www.astm.org), and utilized platinum electrodes. Briefly, the testing procedure involved adding 50 drops of a 0.1% (wt %) ammonium chloride solution dropwise to the surface of the material (3 mm thickness), followed by determination of the maximum voltage at which failure occurred. Performance Level Categories (PLC) were introduced to avoid excessive implied precision and bias. The PLC rating system is shown in Table 6 below and the data are given in FIG. 7.

TABLE 6

| Tracking Index (V) | PLC Rating |
| --- | --- |
| 600 and greater | 0 |
| 400 through 599 | 1 |
| 250 through 399 | 2 |
| 175 through 249 | 3 |
| 100 through 174 | 4 |
| <100 | 5 |

Comparative Tracking Index was determined for samples with 5% aliphatic and aromatic polyamide flow promoter to assess the effect of the polyamide flow promoter on surface properties. The reference composition (60% polyimide (Ultem), 40% GF) has a PLC rating of 4, i.e. passed at 150 V. It was observed that inclusion of either aliphatic or aromatic polyamide flow promoters provided the same PLC values, thus the inclusion of a polyamide flow had no apparent effect on CTI.

Example 6

High shear rheology testing was performed using a capillary rheometer (diagrammatic representation shown in FIG. 8, panel A), which measures viscosity of the resin under high shear rate conditions (>100 sec$^{-1}$). The material was kept at a constant temperature in the barrel as it was pushed by a piston through a capillary die at various rates of shear. The test was performed over a range of temperatures and shear rates that correspond to processing conditions, and the apparent viscosity calculated as a function of shear rate. The testing was carried out as described in the ASTM D3835 test method (ASTM D3835, 2008, "Standard Test Method for Determination of Properties of Polymeric Materials by Means of a Capillary Rheometer," ASTM International, West Conshohocken, Pa., 2003, DOI: 10.1520/D3835-08, www.astm.org).

Figure 8:
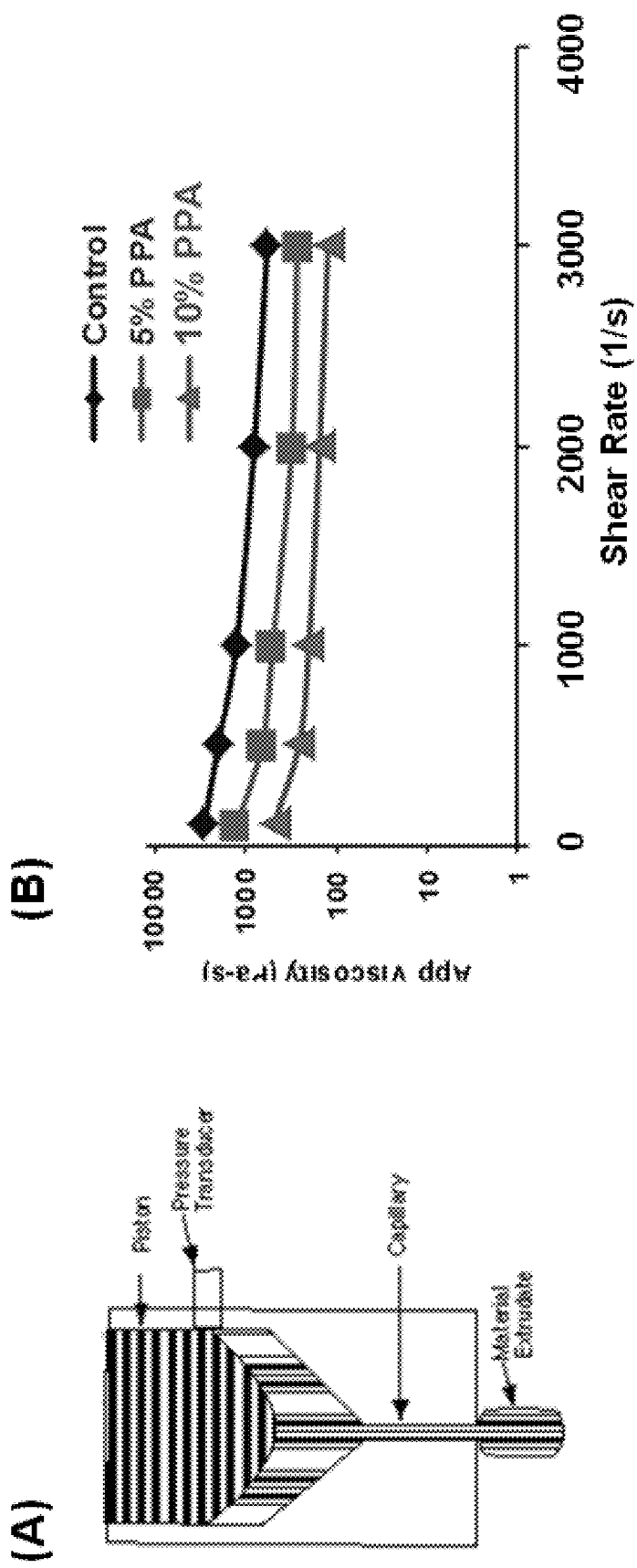
FIG. 8 shows representative high shear viscosity data for exemplary compositions.

Data are shown in FIG. 8 (Panel B), and the results suggest that the inclusion of a polyamide flow promoter significantly reduced the apparent viscosity. For example, the magnitude of viscosity reduction was >50% when the composition contained 5% PPA in 55% polyimide (Ultem), 40% GF at a shear rate of 3000 s$^{-1}$. These data are consistent with the spiral linear flow data.

Example 7

Figure 9:
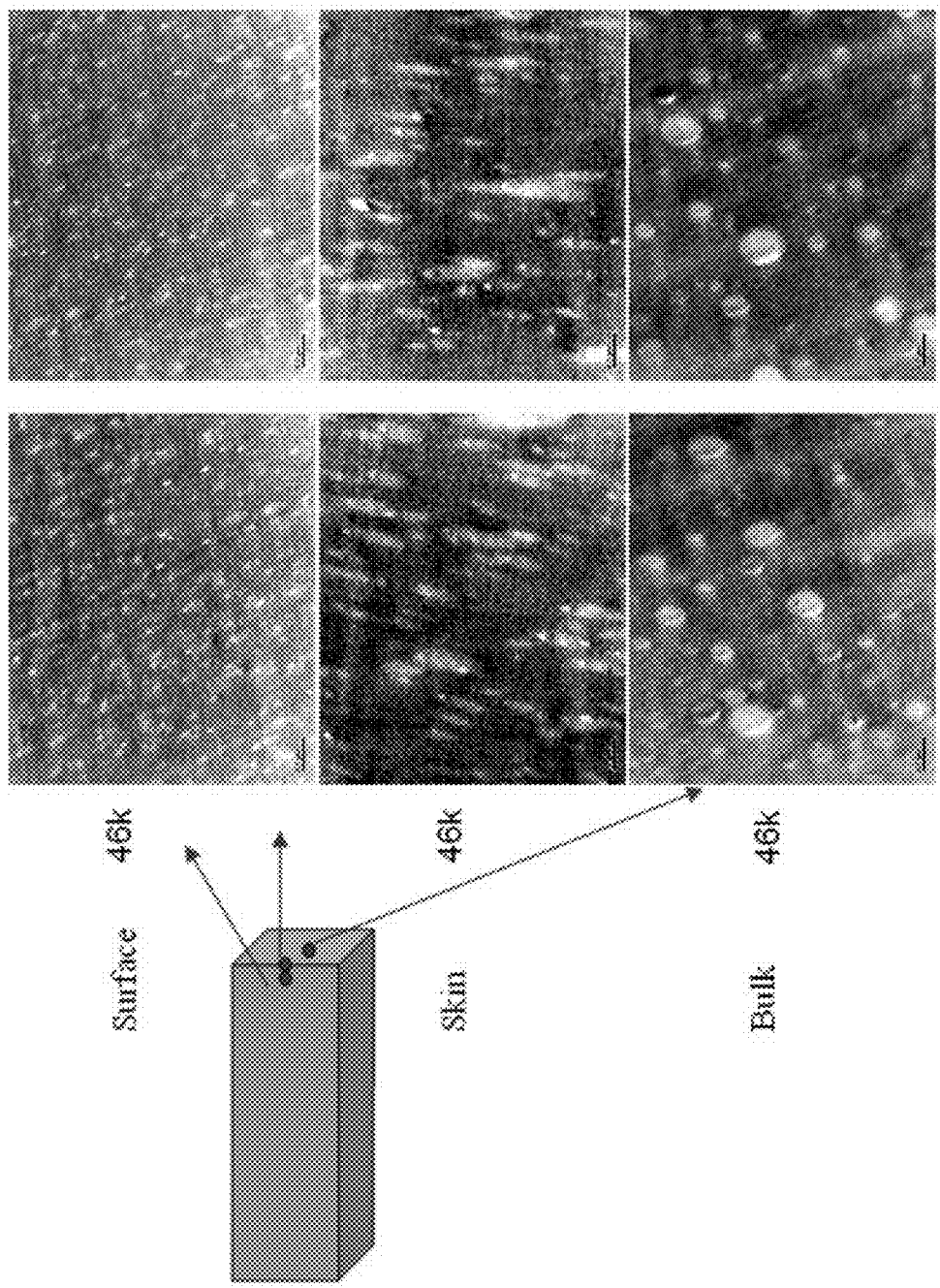
FIG. 9 shows representative scanning electron microscopy images for an exemplary composition.

The morphology of Ultem-PPA blend (without glass fiber) was studied using Transmission Electron Microscopy (TEM). Samples for TEM analysis were prepared by cutting a small piece of the sample using scalpel knife and 50-100 nm thin sections were prepared using a microtome with a diamond knife at low temperature. The thin sections were transferred to a Cu grid. Samples were then taken for TEM observation without staining. Images were acquired with a Tecnai™ T12 microscope (FEI Company) with a beam voltage of 120 KV using bright field, transmitted mode. The SEM images (see FIG. 9) suggest that there is a differentiation in the morphology of the skin and core region. For example, PPA appears to be present as spherical domains in the core or bulk region, whereas it appears as ellipsoidal domains near the skin. Without wishing to be bound by a particular theory, this observation can be attributable to a higher shear rate at the skin compared to the core.

A summary of the comparative properties for several compositions containing a polyamide flow promoter in a Ultem 1010/GF composition are shown in Table 7 below. The compositions comprised the indicate wt % of polyamide flow promoter, 40% GF, and the balance of the composition being Ultem 1010. As the data show, inclusion of about 1-30% of a polyamide flow promoter increases linear flow by about 15% to about 150%. The presence of the polyamide flow promoter either has no effect on important performance parameters (flammability, smoke production, HDT, impact, and strength), or in many compositions an improvement in one or more properties. In some compositions, a high level of a polyamide flow promoter, although providing a robust improvement in flow properties, can have a negative on other desirable properties.

TABLE 7

| | Composition | | | | | | |
|---|---|---|---|---|---|---|---|
| Property* | PA6 1% | PA6 2.5% | PA66 2.5% | PPA 2.5% | Zytel 2.5% | PA6 5% | PPA 5% | PA6 10% |
| Flow Increase | + | +++ | +++ | + | ++ | +++ | ++ | ++++ |
| FR & Smoke | = | = | = | = | = | = | = | -- |
| HDT | -- | -- | -- | = | = | -- | = | -- |
| Impact | + | = | = | = | = | = | = | = |
| Tensile & Flex | = | = | = | = | = | = | = | - |

*Properties are with respect with respect to Ultem 1010 + 40% GF

Table Key:
Flow Increase   15-30% +   31-75% ++   76-120% +++   121-150% ++++
HDT   ↓5-10° C. −   ↓11-20° C. −−   ↓20-30° C. −−−   ↑0-4° C. =   ↑5-10° C. +   ↑11-30° C. ++
Impact, Tensile, Flex   90-110% =   110-120% +   80-90% −
FR & Smoke   +++ Very good   ++ Good   + Slightly better   = Similar   − Slightly lower   -- Poor It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A reinforced polyimide composition comprising:
    (a) from about 10 wt % to 60 wt % of a reinforcing filler;
    (b) from about 1 wt % to about 10 wt % of a polyamide flow promoter; and
    (c) weight % balance of a polyimide base resin;
    wherein the polyimide base resin has a general formula of

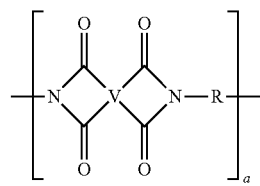

wherein a is greater than or equal to about 1000, V comprises a tetravalent linker, and R comprises a substituted divalent organic radical or an unsubstituted divalent organic radical, or a combination thereof.

2. The composition of claim 1, wherein the polyimide base resin comprises polyetherimide or polyamideimide, or a combination thereof.

3. The composition of claim 1, wherein the reinforcing filler comprises glass fiber, glass flake, glass bead, carbon fiber, or aramid fiber, or a combination thereof.

4. The composition of claim 1, wherein the polyamide flow promoter comprises nylon 6, nylon 66, polyphthalamide, nylon 11, nylon 610, nylon 410, nylon 1010, nylon 1012, or nylon 510, or a combination thereof.

5. The composition of claim 1, wherein the polyimide base resin comprises polyetherimide or polyamideimide, or a combination thereof; wherein the reinforcing filler comprises glass fiber; and wherein the polyamide flow promoter comprises polyphthalamide.

6. A reinforced polyimide composition comprising:
    (a) a polyimide base resin wherein the polyimide base resin has a general formula of

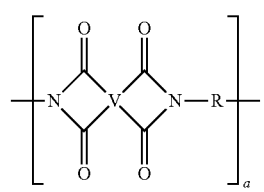

wherein a is greater than or equal to about 1000, V comprises a tetravalent linker, and R comprises a substituted divalent organic radical or an unsubstituted divalent organic radical, or a combination thereof;
(b) a reinforcing filler in an amount resulting in a resin:filler ratio of from about 1:2 to about 9:1; and
(c) a polyamide flow promoter in an amount effective such that the composition exhibits a linear flow during injection molding of at least about 10% greater than that of a reference reinforced polyimide composition consisting essentially of substantially the same proportions of the same polyimide base resin and the same reinforcing filler, in the absence of polyamide flow promoter, under substantially identical injection molding conditions.

7. The composition of claim 6, wherein the polyimide base resin comprises polyetherimide or polyamideimide, or a combination thereof.

8. The composition of claim 6, wherein the reinforcing filler comprises glass fiber, glass flake, glass beads, carbon fiber, or aramid fiber, or a combination thereof.

9. The composition of claim 6, wherein the polyamide flow promoter comprises nylon 6, nylon 66, polyphthalamide, nylon 11, nylon 610, nylon 410, nylon 1010, nylon 1012, or nylon 510, or a combination thereof.

10. The composition of claim 6, wherein the polyimide base resin comprises polyetherimide or polyamideimide, or a combination thereof; wherein the reinforcing filler comprises glass fiber; and wherein the polyamide flow promoter comprises polyphthalamide.

11. A method of increasing linear flow during injection molding of a reinforced polyimide composition, the method comprising combining a polyimide base resin, a reinforcing filler, and a polyamide flow promoter;
wherein the reinforcing filler is combined in an amount resulting in a resin:filler ratio of from about 1:2 to about 9:1; and
wherein the polyamide flow promoter is combined in an amount effective such that the composition exhibits a linear flow during injection molding of at least about 10% greater than that of a reference reinforced polyimide composition consisting essentially of substantially the same proportions of the same polyimide base resin and the same reinforcing filler, in the absence of polyamide flow promoter, under substantially identical conditions;
wherein the polyimide base resin has a general formula of

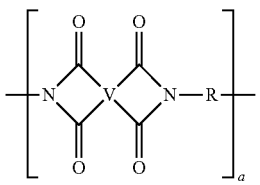

wherein a is greater than or equal to about 1000, V comprises a tetravalent linker, and R comprises a substituted divalent organic radical or an unsubstituted divalent organic radical, or a combination thereof.

12. The method of claim 11, wherein the polyimide base resin comprises polyetherimide or polyamideimide, or a combination thereof.

13. The method of claim 11, wherein the reinforcing filler comprises glass fiber, glass flake, glass beads, carbon fiber, or aramid fiber, or a combination thereof.

14. The method of claim 11, wherein the polyamide flow promoter comprises nylon 6, nylon 66, polyphthalamide, nylon 11, nylon 610, nylon 410, nylon 1010, nylon 1012, or nylon 510, or a combination thereof.

15. The method of claim 11, wherein the polyimide base resin comprises a polyetherimide or polyamideimide, or a combination thereof, wherein the reinforcing filler comprises glass fiber; and wherein the polyamide flow promoter comprises a polyphthalamide.

16. A method of restoring injection molding linear flow loss in a reinforced polyimide composition, the method comprising adding, to a mixture of polyimide base resin and a reinforcing filler, a polyamide flow promoter in an amount sufficient to restore at least about 10% of flow loss observed when comparing injection molding linear flow rate of a reference reinforced polyimide composition consisting essentially of substantially the same proportions of the same polyimide base resin and the same reinforcing filler, in the absence of polyamide flow promoter, under substantially identical injection molding conditions, to injection molding linear flow rate of a substantially identical unfilled reinforced polyimide, in the absence of polyamide flow promoter, under substantially identical injection molding conditions;
wherein the polyimide base resin has a general formula of

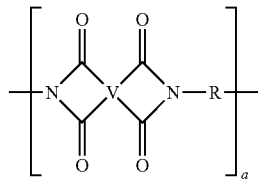

wherein a is greater than or equal to about 1000, V comprises a tetravalent linker, and R comprises a substituted divalent organic radical or an unsubstituted divalent organic radical, or a combination thereof.

17. The method of claim 16, wherein the polyimide base resin comprises polyetherimide or polyamideimide, or a combination thereof.

18. The method of claim 16, wherein the reinforcing filler comprises glass fiber, glass flake, glass beads, carbon fiber, or aramid fiber, or a combination thereof.

19. The method of claim 16, wherein the polyamide flow promoter comprises nylon 6, nylon 66, polyphthalamide, nylon 11, nylon 610, nylon 410, nylon 1010, nylon 1012, or nylon 510, or a combination thereof.

20. The method of claim 16, wherein the polyimide base resin comprises polyetherimide or polyamideimide, or a combination thereof; wherein the reinforcing filler comprises glass fiber; and wherein the polyamide flow promoter comprises polyphthalamide.

* * * * *